(12) United States Patent
Liu et al.

(10) Patent No.: US 11,696,278 B2
(45) Date of Patent: Jul. 4, 2023

(54) METHODS, APPARATUS AND COMPUTER-READABLE MEDIA RELATED TO SEMI-PERSISTENT SCHEDULING CONFIGURATION

(71) Applicant: Telefonaktiebolaget LM Ericsson (publ), Stockholm (SE)

(72) Inventors: Jinhua Liu, Beijing (CN); Min Wang, Luleå (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 61 days.

(21) Appl. No.: 17/253,740

(22) PCT Filed: Jun. 17, 2019

(86) PCT No.: PCT/EP2019/065866
§ 371 (c)(1),
(2) Date: Dec. 18, 2020

(87) PCT Pub. No.: WO2019/243249
PCT Pub. Date: Dec. 26, 2019

(65) Prior Publication Data
US 2021/0266932 A1    Aug. 26, 2021

(30) Foreign Application Priority Data
Jun. 21, 2018 (WO) ................ PCT/CN2018/092199

(51) Int. Cl.
| | |
|---|---|
| *H04W 56/00* | (2009.01) |
| *H04W 72/1263* | (2023.01) |
| *H04W 72/0446* | (2023.01) |
| *H04W 72/23* | (2023.01) |
| *H04W 72/50* | (2023.01) |

(52) U.S. Cl.
CPC ... *H04W 72/1263* (2013.01); *H04W 72/0446* (2013.01); *H04W 72/23* (2023.01); *H04W 72/535* (2023.01)

(58) Field of Classification Search
CPC ......... H04W 72/1263; H04W 72/0446; H04W 72/1257; H04W 72/14
(Continued)

(56) References Cited

U.S. PATENT DOCUMENTS

2010/0113058 A1* 5/2010 Wu ................... H04W 72/02
455/452.1

FOREIGN PATENT DOCUMENTS

| EP | 2 600 680 A1 | 6/2013 |
| WO | 2011 104417 A1 | 9/2011 |

OTHER PUBLICATIONS

3GPP TSG-RAN WG2 Meeting #76; San Francisco, USA; Source: Panasonic; Title: Details on SPS reconfiguration (R2-115891 (resubmission of R2-114970))—Nov. 14-18, 2011.
(Continued)

*Primary Examiner* — Sai Ming Chan
(74) *Attorney, Agent, or Firm* — Baker Botts L.L.P.

(57) ABSTRACT

There is provided a method performed by a wireless device for reconfiguring semi-persistent scheduling. The wireless device is configured with a first semi-persistent scheduling configuration for uplink or downlink transmissions. The method comprises: while semi-persistent scheduling is active according to the first semi-persistent scheduling configuration such that the wireless device is configured with periodic transmission or reception opportunities, receiving a semi-persistent scheduling reconfiguration message from a network node, the semi-persistent scheduling reconfiguration message comprising an instruction to reconfigure the wireless device to a second semi-persistent scheduling configuration for uplink or downlink transmissions; and determining one or more transmission or reception opportunities associated with the second semi-persistent scheduling configuration based on a semi-persistent scheduling activation
(Continued)

time according to the second semi-persistent scheduling configuration.

20 Claims, 13 Drawing Sheets

(58) Field of Classification Search
USPC .......................................................... 370/329
See application file for complete search history.

(56) References Cited

OTHER PUBLICATIONS

3GPP TSG-RAN WG2 RAN2#101; Athens, Greece; Source: Ericsson; Title: RRC reconfiguration of SPS-Config (Tdoc R2-1803537)—Feb. 26-Mar. 2, 2018.

3GPP TSG-RAN WG2 Meeting #102; Busan, Korea; Source: ASUSTeK; Title: Clarification on SPS and GF reconfiguration (R2-1806903)—May 21-25, 2018.

PCT International Search Report issued for International application No. PCT/EP2019/065866—dated Sep. 16, 2019.

PCT Written Opinion of the International Searching Authority issued for International application No. PCT/EP2019/065866—dated Sep. 16, 2019.

3GPP TS 38.321 v15.1.0; Technical Specification; 3rd Generation Partnership Project; Technical Specification Group Radio Access Network; NR; Medium Access Control (MAC) protocol specification (Release 15)—Mar. 2018.

3GPP TS 38.331 v15.1.0; Technical Specification; 3rd Generation Partnership Project; Technical Specification Group Radio Access Network; NR; Radio Resource Control (RRC) protocol specification (Release 15)—Mar. 2018.

* cited by examiner

METHODS, APPARATUS AND COMPUTER-READABLE MEDIA RELATED TO SEMI-PERSISTENT SCHEDULING CONFIGURATION

PRIORITY

This nonprovisional application is a U.S. National Stage Filing under 35 U.S.C. § 371 of International Patent Application Serial No. PCT/EP2019/065866 filed Jun. 17, 2019 and entitled "Methods, Apparatus and Computer Readable Media Related to Semi-Persistent Scheduling Configuration" which claims priority to PCT International Patent Application No. PCT/CN2018/092199 filed Jun. 21, 2018 both of which are hereby incorporated by reference in their entirety.

TECHNICAL FIELD

Embodiments of the disclosure relate to wireless networks, nodes and devices, and particularly to methods, apparatus and computer-readable media for configuration of semi-persistent scheduling.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In NR, semi-persistent scheduling (SPS) is supported for both uplink and downlink. In downlink, it is still referred to as SPS as in LTE, while in uplink it is referred to as configured grant Type 2. In this way, the gNB is able to configure SPS DL assignments or SPS uplink grant for a UE separately. In both cases, the UE is configured with periodic resources with which to transmit or receive data (e.g. transmission frequencies, time resources, etc). Such resources may be referred to as transmission opportunities or reception opportunities.

One benefit of SPS is that the UE can receive data from the gNB in downlink, and/or transmit data to the gNB in uplink, without receiving a DL assignment or an uplink grant via DCI signalling. In such a way, the PDCCH overhead in transmitting separate DL assignments or uplink grants can be saved.

For downlink SPS, the SPS configuration comprises a set of parameters such as one or more of periodicity, number of HARQ processes and PUCCH resources. These parameters may be configured via RRC signalling. The serving gNB determines when to activate the DL SPS resources via a downlink DCI. Once activated, the UE determines the periodic transmission occurrences based on joint consideration of the configured parameters from RRC signalling and SPS activation grant according to the following formula in Section 5.8.1 of 3GPP TS 38.321-f10:

"After a downlink assignment is configured for SPS, the MAC entity shall consider sequentially that the Nth downlink assignment occurs in the slot for which:

(numberOfSlotsPerFrame×SFN+slot number in the frame)=[(numberOfSlotsPerFrame×SFNstart time+slotstart time)+$N$×semiPersistSchedInter-valDL×numberOfSlotsPerFrame/10]modulo (1024×numberOfSlotsPerFrame)

where SFNstart time and slotstart time are the system frame number (SFN) and slot, respectively, of the first transmission of PDSCH where the configured downlink assignment was (re-)initialised."

For uplink SPS, which is referred to as configured UL grant Type 2 in NR, a similar SPS configuration is signalled by the gNB via RRC signalling, including a set of parameters such as periodicity, number of HARQ processes and power control parameters. The serving gNB determines when to activate the configured UL grant Type 2 and convey the physical layer parameters such as time-frequency resources and MCS via an uplink grant. Then the UE determines the periodic transmission occurrences based on the joint consideration of the configured parameters from RRC signalling and SPS activation grant according to Section 5.8.2 of 3GPP TS 38.321-f10:

"After an uplink grant is configured for a configured grant Type 2, the MAC entity shall consider sequentially that the $N^{th}$ uplink grant occurs associated with the symbol for which:

[(SFN×numberOfSlotsPerFrame×numberOfSymbolsPerSlot)+(slot number in the frame×numberOfSymbolsPerSlot)+symbol number in the slot]=[(SFN$_{start\ time}$×numberOfSlotsPerFrame× numberOfSymbolsPerSlot+slot$_{start\ time}$×numberOfSymbolsPerSlot+symbol$_{start\ time}$)+$N$×periodicity]modulo(1024×numberOfSlotsPerFrame× numberOfSymbolsPerSlot)

where SFN$_{start\ time}$, slot$_{start\ time}$, and symbol$_{start\ time}$ are the SFN, slot, and symbol, respectively, of the first transmission of PUSCH where the configured uplink grant was (re-)initialised."

For configured uplink grant Type 2, the UE does not need to send scheduling requests (SRs) and the service data can be transmitted using the configured uplink grant Type 2, which saves SR transmission and reduces the delay from SR to UL grant and the encoding delay after receiving the UL grant.

In LTE, the SPS is initially designed for flat rate services such as VoIP or video, while in later releases, it may also be used for instant uplink data transmission. For instant uplink access, the SPS resource can be assigned to multiple users, with the gNB resolving the contention by relying on DMRS detection (e.g. DMRS sequence or cyclic prefix). In this scenario, reconfiguration of SPS seems unnecessary since the service provided using SPS has close transmission latency requirement in radio interface. In 3GPP TS 36.331 v15.1.0, it is explicitly declared that the reconfiguration of SPS is not applied except for the case of master cell group (MCG) handover.

There currently exist certain challenge(s).

In NR, it is explicitly claimed in the discussion that SPS (and configured uplink grant Type 2) can be used for various services including URLLC services. URLLC has much tighter latency and higher reliability requirement than that of eMBB and VoIP service over the air interface. Reconfiguration of SPS (and configured uplink grant Type 2) may be necessary if a single SPS configuration is unsuitable to fit such diverse QoS requirements.

Considering the various QoS requirements of different services (e.g. eMBB, VoIP and URLLC) for a UE, prohibiting reconfiguration of SPS (and configured uplink grant Type 2) for a UE in NR as in LTE seems not feasible, i.e., it is better to enable SPS reconfiguration with regards to the service change of a UE.

However, there may be an ambiguity issue for a UE on determination of the reception opportunity occurrence (for SPS DL) or transmission opportunity occurrence (for configured uplink grant of Type 2) when the SPS DL or configured uplink grant Type 2 is reconfigured.

For both downlink SPS and configured UL grant Type 2 for a UE, if the SPS periodicity is reconfigured when a downlink SPS grant or configured UL grant Type 2 is active, the UE may need to refer to the activation time in order to determine the reception or transmission reoccurrences respectively for the new configuration. Even though the UE may remember system frame number and the subframe number when the downlink SPS and configured UL grant Type 2 is activated, there is still an ambiguity for a UE to determine the reception/transmission occurrences when the SPS reconfiguration time is in a different hyper-frame (a hyper frame is 1024 radio frames, i.e. 10.24 s) than the one during which the existing active SPS assignment or configured UL grant of Type 2 is activated, because the index of the first reception/transmission opportunity occurrence start from 0 according to the formulas set out above.

Certain aspects of the present disclosure and their embodiments may provide solutions to these or other challenges.

SUMMARY

In one aspect, the new SPS (or Type 2 configured uplink scheduling) configuration is used only when a new SPS activation/reactivation command is received. In another aspect, the existing SPS assignment (or configured uplink grant of Type 2) according to the old SPS configuration is deactivated automatically when the new SPS (or Type 2 configured uplink scheduling) configuration is received. In a third aspect, the UE derives the total elapsed time since the current SPS assignment (or configured uplink grant of Type 2) is activated and determines the reception occurrence of the new SPS configuration according to the elapsed time.

There are, proposed herein, various embodiments which address one or more of the issues disclosed herein. In one embodiment, there is provided a method performed by a wireless device for reconfiguring semi-persistent scheduling. The wireless device is configured with a first semi-persistent scheduling configuration for uplink or downlink transmissions. The method comprises: while semi-persistent scheduling is active according to the first semi-persistent scheduling configuration such that the wireless device is configured with periodic transmission or reception opportunities, receiving a semi-persistent scheduling reconfiguration message from a network node, the semi-persistent scheduling reconfiguration message comprising an instruction to reconfigure the wireless device to a second semi-persistent scheduling configuration for uplink or downlink transmissions; and determining one or more transmission or reception opportunities associated with the second semi-persistent scheduling configuration based on a semi-persistent scheduling activation time according to the second semi-persistent scheduling configuration.

In another embodiment, there is provided a method performed by a base station for reconfiguring semi-persistent scheduling of a wireless device. The wireless device being configured with active semi-persistent scheduling according to a first semi-persistent scheduling configuration such that the wireless device is configured with periodic transmission or reception opportunities. The method comprises: initiating transmission of a semi-persistent scheduling reconfiguration message to the wireless device, the semi-persistent scheduling reconfiguration message comprising an instruction to reconfigure the wireless device to a second semi-persistent scheduling configuration for uplink or downlink transmissions; and providing a semi-persistent scheduling activation time for the second semi-persistent scheduling configuration, to enable the wireless device to determine one or more transmission or reception opportunities associated with the second semi-persistent scheduling configuration.

Certain embodiments may provide one or more technical advantage(s), by resolving any ambiguity when reconfiguring a wireless device from a first SPS configuration to a second SPS configuration, particularly while SPS is active.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 1:
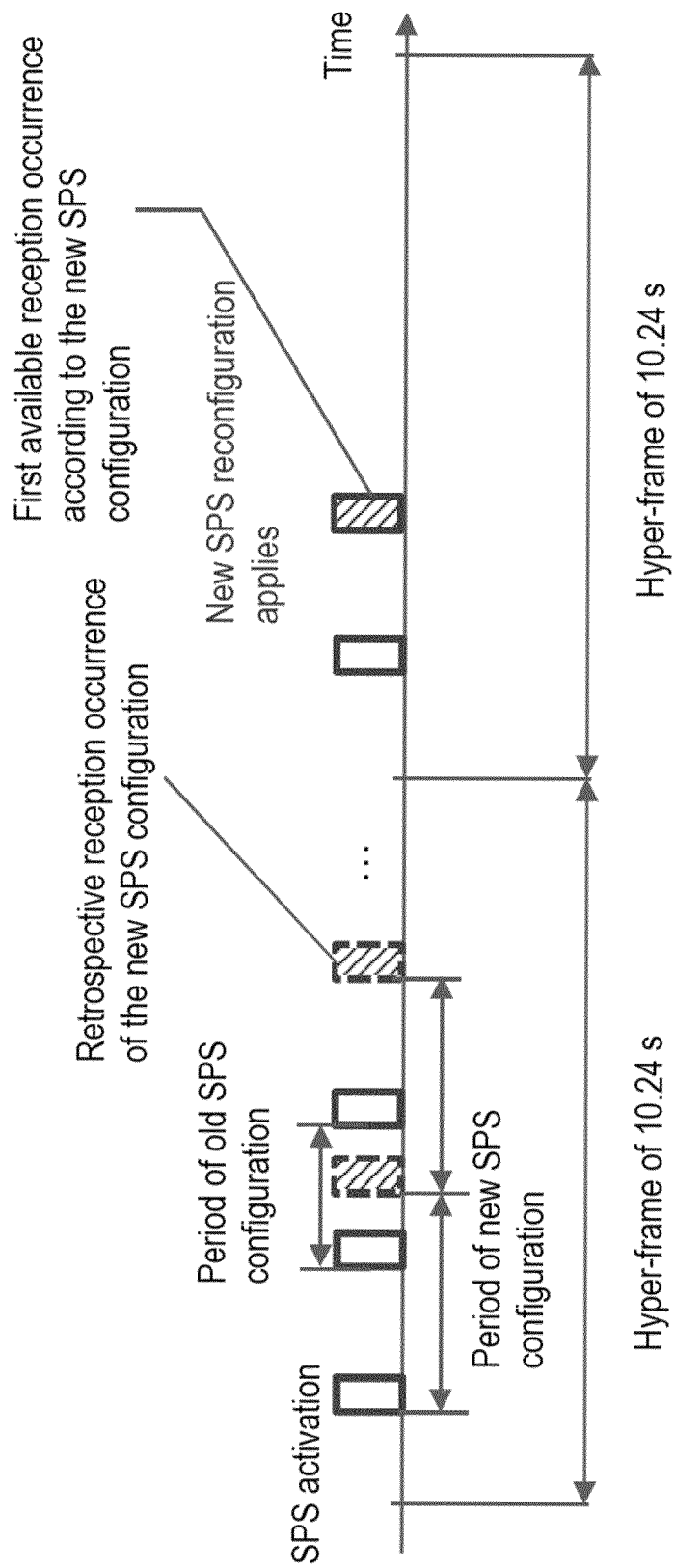
FIG. 1 is a schematic diagram showing an example of SPS reconfiguration according to embodiments of the disclosure.

FIG. 1 shows an example of SPS reconfiguration according to embodiments of the disclosure. The Figure shows SPS downlink and corresponding reception opportunities, but those skilled in the art will appreciate that the concepts disclosed are equally applicable to SPS uplink and corresponding transmission opportunities. Reception opportunities according to a first SPS configuration are shown unfilled; reception opportunities according to a second SPS configuration are shown with diagonal lines.

In a first hyper-frame, a UE is configured with a first SPS configuration and this is activated by a wireless message received from the base station (e.g., via a physical downlink control channel). Thus the UE is configured with periodic resources in which to receive transmissions from the base station (illustrated in blue in FIG. 1). As noted above, one or more parameters associated with the periodic resources according to the first SPS configuration may be provided by way of RRC signalling. For example, one or more of the periodicity (e.g., the interval between consecutive reception opportunities), number of HARQ processes and PUCCH resources may be provided by way of RRC signalling from the base station to the UE. Additionally or alternatively, one or more parameters associated with the periodic resources according to the first SPS configuration may be provided by way of the SPS activation message. For example, one or more of: transmission frequency resources (e.g., sub-bands or sub-channels, etc), specific time resources, modulation and coding schemes may be provided by way of the SPS activation message (e.g., downlink control information transmitted over a physical downlink control channel).

Thus the UE is configured with periodic resources in which to receive transmissions from the base station. The time component of these periodic resources is calculated based on the SPS activation time (e.g., when the SPS activation message is received) and the periodicity or interval associated with the first SPS configuration. For example, the time component may be calculated according to the following formula in Section 5.8.1 of 3GPP TS 38.321-f10:

"After a downlink assignment is configured for SPS, the MAC entity shall consider sequentially that the $N^{th}$ downlink assignment occurs in the slot for which:

(numberOfSlotsPerFrame×SFN+slot number in the frame)=[(numberOfSlotsPerFrame×SFNstart time+slot$_{start\ time}$)+$N$×semiPersistSchedInterval$DL$×numberOfSlotsPerFrame/10]modulo (1024×numberOfSlotsPerFrame)

where SFNstart time and slotstart time are the system frame number (SFN) and slot, respectively, of the first transmission of PDSCH where the configured downlink assignment was (re-)initialised."

The SPS of the UE persists (i.e. is continually active) into a second hyper-frame, with the reception opportunities calculated based on the periodicity of the first SPS configuration and the activation time of the first SPS configuration. However, in the second hyper-frame, while SPS remains active, the UE is reconfigured with a second SPS configuration. The reconfiguration may be instructed by way of a SPS reconfiguration message received from the base station (e.g., using RRC signalling).

In this instance, it is unclear how the UE should calculate reception opportunities (or transmission opportunities) according to the new, second SPS configuration, as the UE cannot determine the original SPS activation time according to the existing specification.

According to embodiments of the disclosure, upon receiving a SPS reconfiguration message while SPS is active, the wireless device is operable to determine one or more transmission or reception opportunities associated with the new, SPS configuration based on a SPS activation time according to or associated with the second SPS configuration.

The SPS activation time may differ according to different embodiments. For example, in one embodiment, the SPS activation time is defined as the time at which a subsequent SPS activation message is received. In another embodiment, the SPS reconfiguration message may specify a particular activation time for the second SPS configuration. In this case, the activation message may be the same time that the SPS reconfiguration message was received, or a later time (e.g., to allow the UE sufficient time to decode and process the SPS reconfiguration message).

In the meantime (i.e., until the subsequent SPS activation message is received), the UE may continue to utilize transmission/reception opportunities as defined according to the first SPS configuration or, alternatively, the UE may deactivate the existing SPS configuration such that transmission/reception opportunities defined according to the first SPS configuration are not utilized.

In a further embodiment, the SPS activation time according to the second SPS configuration may be the same as the SPS activation time according to the first SPS configuration. In this embodiment, the UE may calculate the SPS activation time based on the periodicity (or interval) associated with the first SPS configuration and the index of a previous transmission/reception opportunity. The SPS activation time may be in an earlier hyper-frame than that in which the SPS reconfiguration message was received. A next or subsequent transmission/reception opportunity according to the second SPS configuration may then be calculated based on the SPS activation time and the periodicity (e.g., interval) associated with the second SPS configuration. The index associated with the next or subsequent transmission/reception opportunity as calculated according to the second SPS configuration may be different to that as calculated according to the first SPS configuration (e.g., due to the different periodicity).

These and other related concepts are set out below with respect to FIGS. 2, 3, 4 and 5.

Figure 2:
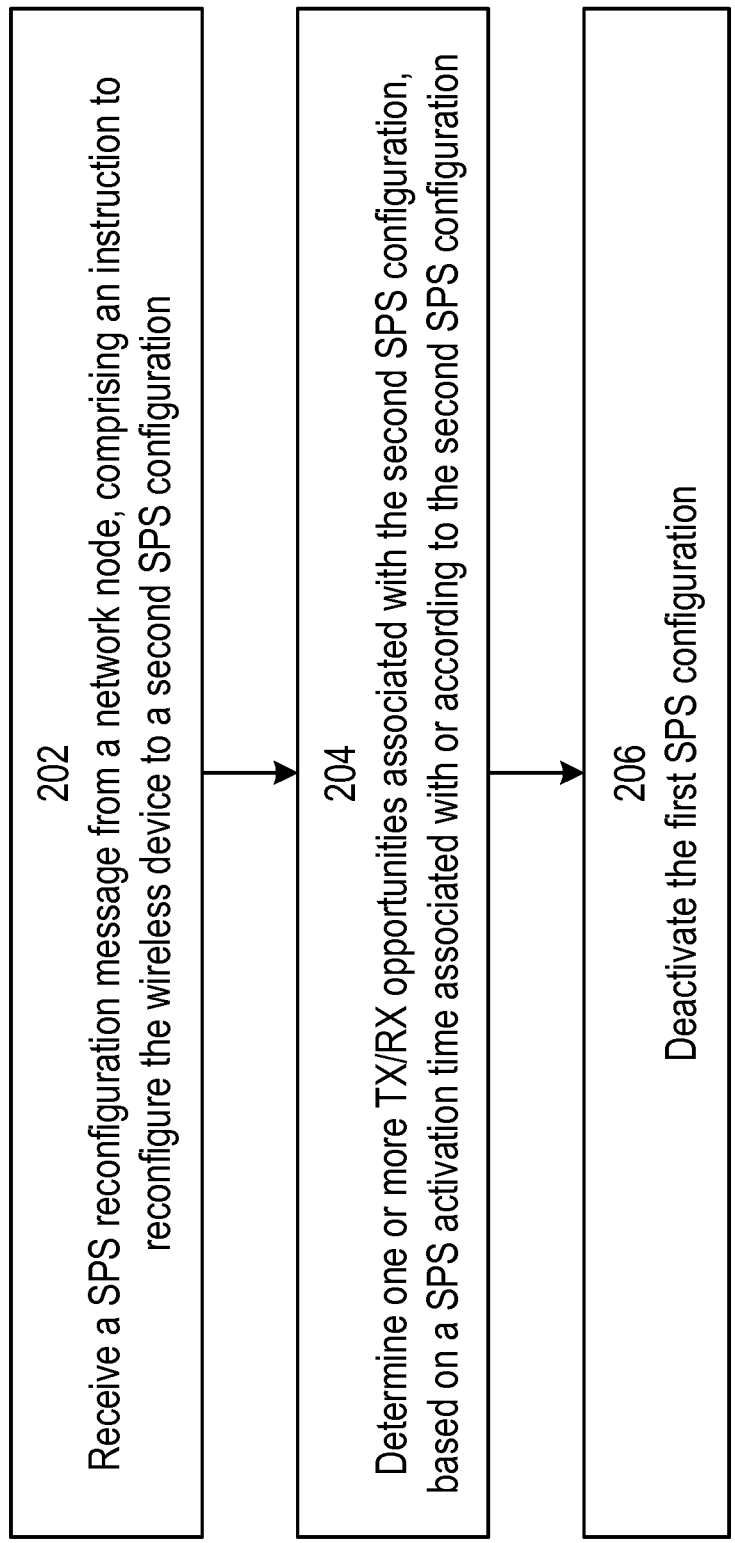
FIG. 2 is a flowchart of a method performed by a wireless device according to embodiments of the disclosure.

FIG. 2 depicts a method in accordance with particular embodiments of the disclosure. The method may be performed in a wireless device or a UE (such as the wireless device 610 or the UE 700 described below).

The wireless device is configured with a first SPS configuration for uplink or downlink transmissions. The first SPS configuration may be configured in the wireless device using one or more of an SPS configuration message (e.g., transmitted using RRC signalling) and an SPS activation message (e.g., transmitted using a downlink control channel).

The SPS configuration may comprise a set of one or more parameters. For example, one or more of the periodicity (e.g., the interval between consecutive reception opportunities), number of HARQ processes and PUCCH resources may be specified in the SPS configuration message provided by way of RRC signalling from a network node (e.g., a serving base station such as the network node 660 described below) to the UE. For example, one or more of: transmission frequency resources (e.g., sub-bands or sub-channels, etc), specific time resources, modulation and coding schemes may be provided by way of the SPS activation message (e.g., downlink control information transmitted over a physical downlink control channel). These parameters are intended as examples only. Different parameters may be provided in the SPS configuration and activation messages. In some embodiments, all SPS parameters may be provided in the SPS configuration message.

Thus the wireless device is configured with periodic resources defining transmission or reception opportunities according to the first SPS configuration. The periodic resources may be defined in accordance with an SPS activation time (e.g., when the SPS activation message is received, or as specified in the SPS activation message, etc), and a periodicity or interval of the first SPS configuration. In downlink, the timeslot of each reception opportunity may be calculated according to the following formula in Section 5.8.1 of 3G PP TS 38.321-f10:

"After a downlink assignment is configured for SPS, the MAC entity shall consider sequentially that the $N^{th}$ downlink assignment occurs in the slot for which:

(numberOfSlotsPerFrame×SFN+slot number in the frame)=[(numberOfSlotsPerFrame×SFNstart time+slotstart time)+$N$×semiPersistSchedInter-vaIDL×numberOfSlotsPerFrame/10]modulo (1024×numberOfSlotsPerFrame)

where SFNstart time and slotstart time are the system frame number (SFN) and slot, respectively, of the first transmission of PDSCH where the configured downlink assignment was (re-)initialised."

In uplink, the timeslot of each transmission opportunity may be calculated according to Section 5.8.2 of 3GPP TS 38.321-f10:

"After an uplink grant is configured for a configured grant Type 2, the MAC entity shall consider sequentially that the $N^{th}$ uplink grant occurs associated with the symbol for which:

[(SFN×numberOfSlotsPerFrame×numberOfSymbolsPerSlot)+(slot number in the frame×numberOfSymbolsPerSlot)+symbol number in the slot]=[(SFN$_{start\ time}$×numberOfSlotsPerFrame×numberOfSymbolsPerSlot+slot$_{start\ time}$×numberOfSymbolsPerSlot+symbol$_{start\ time}$)+$N$×periodicity]modulo(1024×numberOfSlotsPerFrame×numberOfSymbolsPerSlot)

where SFN$_{start\ time}$, slot$_{start\ time}$, and symbol$_{start\ time}$ are the SFN, slot, and symbol, respectively, of the first transmission of PUSCH where the configured uplink grant was (re-)initialised."

In step 202, while SPS is active (i.e., the wireless device is configured with periodic resources as specified above), the wireless device receives an SPS reconfiguration message from a network node (e.g., the serving base station, such as network node 660 described below). The SPS reconfiguration message comprises an instruction to reconfigure the wireless device to a second SPS configuration, which is different to the first SPS configuration (i.e. comprising one or more SPS parameters which differ from the parameters of the first SPS configuration). The SPS reconfiguration message may be transmitted using RRC signalling.

In some embodiments, the SPS reconfiguration message may be received in a different hyper-frame to that in which the SPS was activated. In other embodiments, the SPS reconfiguration message may be received in the same hyper-frame as that in which the SPS was activated.

In step 204, the wireless device determines one or more transmission (for uplink) or reception (for downlink) opportunities associated with the second SPS configuration, based on an SPS activation time associated with or according to the second SPS configuration. The wireless device may subsequently utilize those transmission opportunities to transmit data to the network node (e.g., the serving base station), or those reception opportunities to listen for data transmitted from the network node.

In step 206, the wireless device deactivates the SPS according to the first SPS configuration. That is, transmission/reception opportunities according to the first SPS configuration are no longer utilized by the wireless device.

The SPS activation time associated with the second SPS configuration may vary in different embodiments of the disclosure.

In one embodiment, the SPS activation time associated with the second SPS configuration is the time at which a further SPS activation message is received from the network node (e.g., subsequent to the SPS reconfiguration message), or a time specified in the further SPS activation message. In the latter case, the time may be specified as an absolute time, or a time relative to the time at which the SPS activation message was received (e.g., a specified amount of time after transmission of the SPS activation message). Relative time may be specified in any suitable units, such as OFDM symbols, TTIs, time slots, subframes, system frames, etc. Absolute time may similarly be specified in any suitable format, such as OFDM symbol number, TTI number, time slot number, subframe number system, system frame number, hyper-frame number, etc. The SPS activation message may be transmitted via a downlink control channel, such as the physical downlink control channel. The SPS activation message may comprise DCI.

In another embodiment, the SPS activation time may be specified in or defined relative to the SPS reconfiguration message received in step 202, e.g., without requiring an SPS activation message. In one embodiment, the SPS activation time may be the time at which the SPS reconfiguration message is received, or a predefined period of time thereafter. Alternatively, the SPS activation time may be specified within the SPS reconfiguration message itself, e.g., as an absolute time or a time relative to the time (e.g. a timing offset) at which the SPS reconfiguration message was received. The SPS activation time may be specified to a value which leaves sufficient time for the wireless device to process the SPS reconfiguration message before SPS activation according to the new, second SPS configuration.

In either embodiment, transmission/reception opportunities defined according to the first SPS configuration may continue to be calculated and used by the wireless device for transmission or reception of data up until the SPS activation time associated with the second SPS configuration. The benefit of this is that the wireless device can continue to be served with the existing SPS configuration until the second SPS configuration is activated. Thus, in these embodiments, step 206 takes place upon the SPS activation time associated with the second SPS configuration.

In alternative embodiments, transmission/reception opportunities defined according to the first SPS configuration may not be calculated and/or used by the wireless device for transmission or reception of data upon receipt of the SPS reconfiguration message in step 202. That is, the SPS is effectively or explicitly deactivated responsive to receipt of the SPS reconfiguration message. The deactivation may take place immediately upon receipt of the SPS reconfiguration message or a defined period thereafter. Thus in these embodiments, step 206 may take place upon reception of the SPS reconfiguration message in step 202 or shortly thereafter. The benefit of this is that ambiguity between the first and second SPS configurations is simply resolved without complex calculation or significant additional signalling. This method has the disadvantage that the wireless device is not provided with any transmission/reception opportunities for a period of time; however, this period of time can be made relatively short by activating SPS according to the second SPS configuration soon after the SPS reconfiguration (e.g., setting the SPS activation according to any of the methods set out above).

In a further alternative embodiment, the SPS activation time associated with the second SPS configuration is the same as the SPS activation time associated with the first SPS configuration. In this embodiment, the wireless device may be operable to determine the SPS activation time associated with the first SPS configuration, and then to calculate transmission/reception opportunities according to the second SPS configuration based on that SPS activation time and the periodicity of the second SPS configuration. The SPS activation time associated with the first SPS configuration may be stored in the wireless device, particularly when the activation time occurs in the same hyper-frame as that in which the SPS reconfiguration message is received. Alternatively, the SPS activation time associated with the first SPS configuration may be calculated based on a previous transmission/reception opportunity. Using knowledge of the index of that previous transmission/reception opportunity (where the index increments with each successive transmission/reception opportunity) and the periodicity (e.g., interval) of the first SPS configuration, the wireless device is operable to determine the SPS activation time associated with the first SPS configuration.

For instance, if the last reception/transmission opportunity is the X-th occasion according to the existing configuration, p slots and q OFDM symbols have elapsed since the last reception/transmission opportunity, the total number of OFDM symbols since the activation time is:

$$(X-1)*periodicity_{firstSPS}+p*\text{number of OFDM symbols in a slot}+q.$$

where $periodicity_{firstSPS}$ is the periodicity or interval of the first SPS configuration in OFDM symbols.

The SPS activation time associated with the first SPS configuration can then be calculated by subtracting this number of symbols from the current time.

The index associated with a next or subsequent transmission/reception opportunity according to the new, second SPS configuration may then be calculated by dividing the total amount of time lapsed since the SPS activation time by the periodicity associated with the second SPS configuration, and then mapping this quantity to the next highest integer (also known as a "ceiling" function). Further transmission/reception opportunities may be calculated using this index and the calculated activation time.

In this embodiment, transmission/reception opportunities defined according to the first SPS configuration may not be calculated and/or used by the wireless device for transmission or reception of data upon receipt of the SPS reconfiguration message in step 202, or a period of time thereafter as discussed above.

In embodiments without an additional SPS activation message, it will be noted that the resources (e.g., transmission frequencies, etc) to be used for the periodic transmission/reception opportunities according to the second SPS configuration may either remain the same as those used according to the first SPS configuration or, alternatively, be specified in the SPS reconfiguration message itself.

Figure 3:
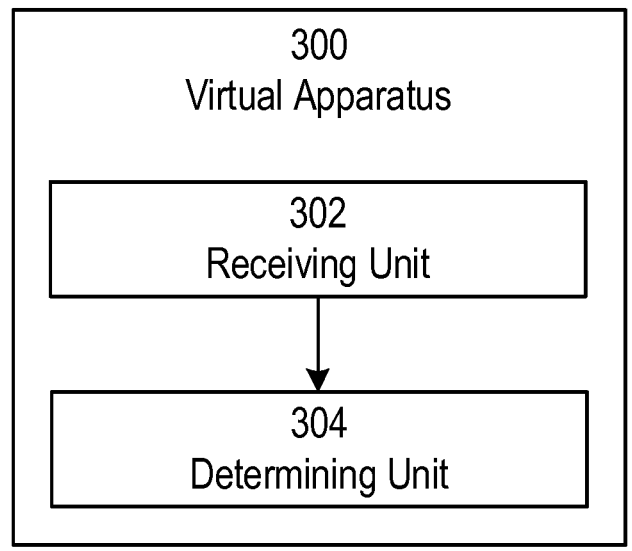
FIG. 3 is a schematic diagram of a wireless device according to embodiments of the disclosure.
Figure 6:
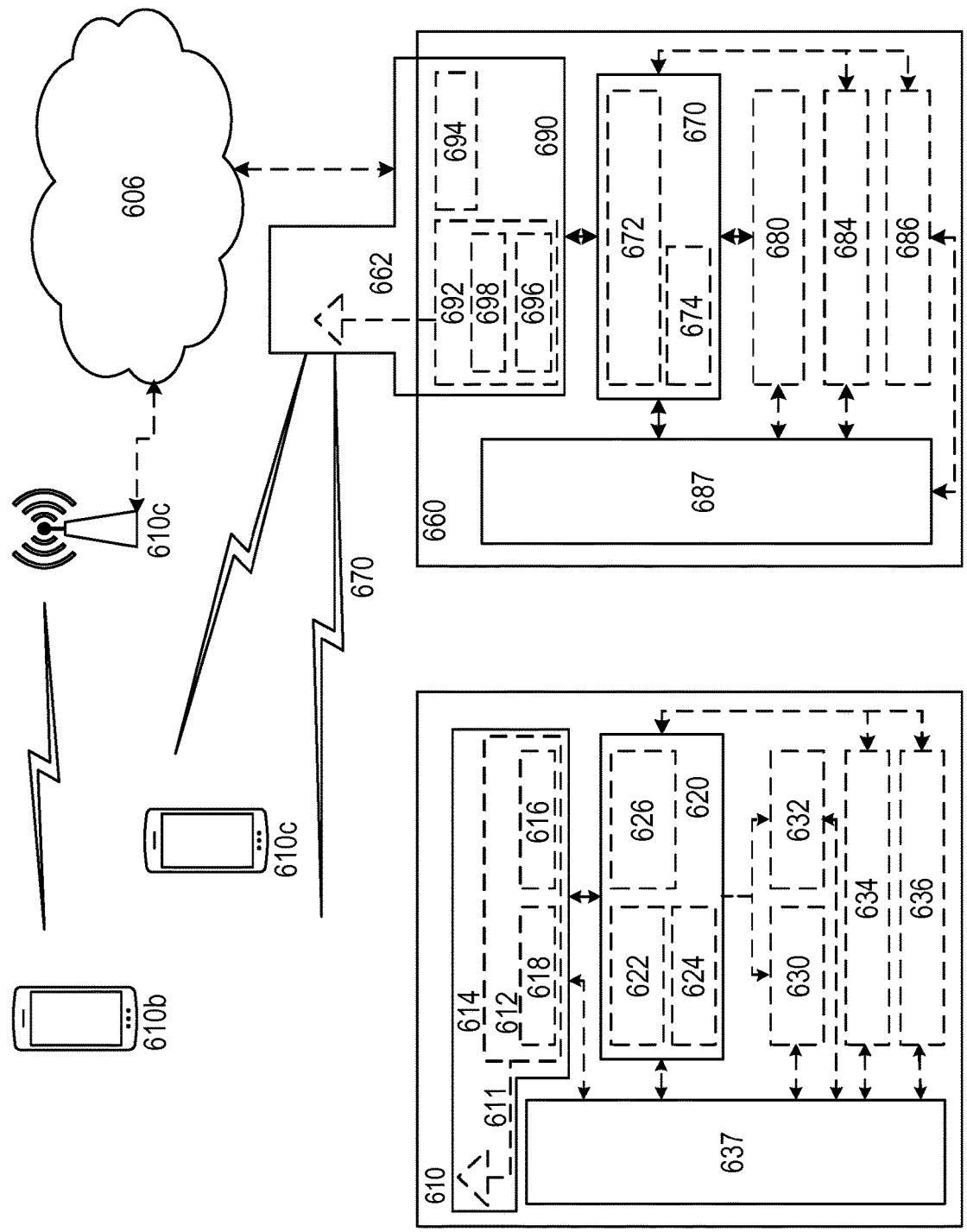
FIG. 6 shows a wireless network according to embodiments of the disclosure.

FIG. 3 illustrates a schematic block diagram of an apparatus 300 in a wireless network (for example, the wireless network shown in FIG. 6). The apparatus may be implemented in a wireless device or network node (e.g., wireless device 610 or network node 660 shown in FIG. 6). Apparatus 300 is operable to carry out the example method described with reference to FIG. 2 and possibly any other processes or methods disclosed herein. It is also to be understood that the method of FIG. 2 is not necessarily carried out solely by apparatus 300. At least some operations of the method can be performed by one or more other entities.

Virtual Apparatus 300 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause the receiving unit 302 and the determining unit 304, and any other suitable units of apparatus 300 to perform corresponding functions according one or more embodiments of the present disclosure.

As illustrated in FIG. 3, apparatus 300 includes a receiving unit 302 and a determining unit 304. The receiving unit 302 is configured to receive, while semi-persistent scheduling is active according to a first semi-persistent scheduling configuration such that the wireless device is configured with periodic transmission or reception opportunities, a semi-persistent scheduling reconfiguration message from a network node, the semi-persistent scheduling reconfiguration message comprising an instruction to reconfigure the wireless device to a second semi-persistent scheduling configuration for uplink or downlink transmissions. The determining unit 304 is configured to determine one or more transmission or reception opportunities associated with the second semi-persistent scheduling configuration based on a semi-persistent scheduling activation time according to the second semi-persistent scheduling configuration.

Figure 4:
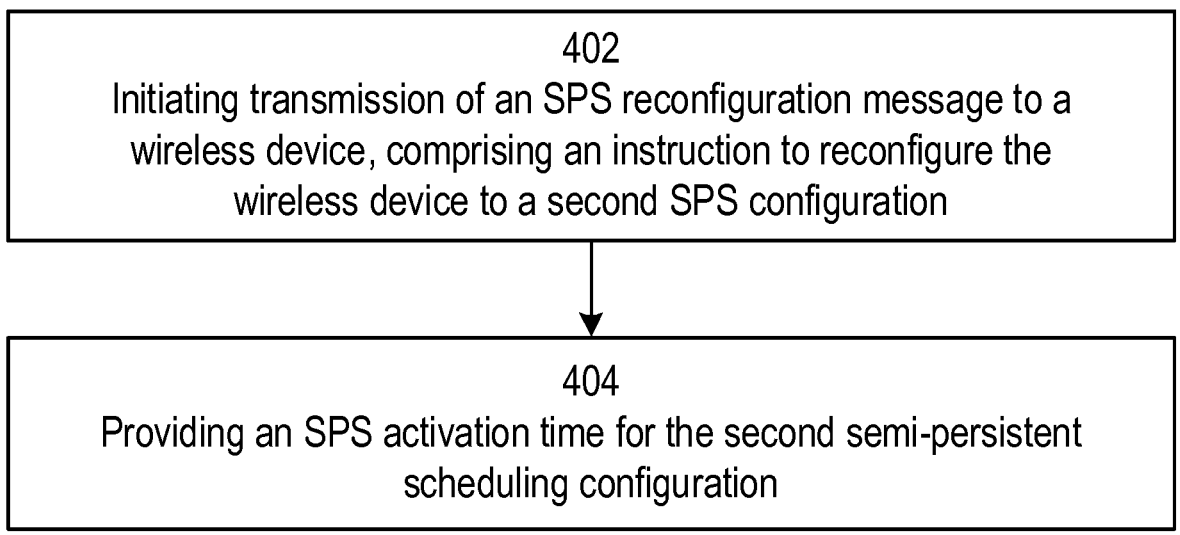
FIG. 4 is a flowchart of a method performed by a network node according to embodiments of the disclosure.

FIG. 4 depicts a method in accordance with particular embodiments of the disclosure for reconfiguring a wireless device. The method may be performed in a network node (e.g., a radio access network node such as the network node 660 described below). The network node may be a serving network node or base station for the wireless device. Alternatively, the network node may be logically coupled to such a serving network node or base station, and configured to instruct the serving network node or base station to transmit messages to the wireless device. In this latter embodiment, the network node may be implemented in the cloud or a remote computer processing environment. The method of FIG. 4 is complementary to certain embodiments described above with respect to FIG. 2.

The wireless device is configured with a first SPS configuration for uplink or downlink transmissions. The first SPS configuration may be configured in the wireless device using one or more of an SPS configuration message (e.g., transmitted using RRC signalling) and an SPS activation message (e.g., transmitted using a downlink control channel).

The SPS configuration may comprise a set of one or more parameters. For example, one or more of the periodicity (e.g., the interval between consecutive reception opportunities), number of HARQ processes and PUCCH resources may be specified in the SPS configuration message provided by way of RRC signalling from a network node (e.g., a serving base station such as the network node 660 described below) to the UE. For example, one or more of: transmission frequency resources (e.g., sub-bands or sub-channels, etc), specific time resources, modulation and coding schemes may be provided by way of the SPS activation message (e.g., downlink control information transmitted over a physical downlink control channel). These parameters are intended as examples only. Different parameters may be provided in the SPS configuration and activation messages. In some embodiments, all SPS parameters may be provided in the SPS configuration message.

Thus the wireless device is configured with periodic resources defining transmission or reception opportunities according to the first SPS configuration. The periodic resources may be defined in accordance with an SPS activation time (e.g., when the SPS activation message is received, or as specified in the SPS activation message, etc), and a periodicity or interval of the first SPS configuration. In downlink, the timeslot of each reception opportunity may be calculated according to the following formula in Section 5.8.1 of 3GPP TS 38.321-f10:

"After a downlink assignment is configured for SPS, the MAC entity shall consider sequentially that the $N^{th}$ downlink assignment occurs in the slot for which:

(numberOfSlotsPerFrame×SFN+slot number in the frame)=[(numberOfSlotsPerFrame×SFNstart time+slotstart time)+$N$×semiPersistSchedInterval DL×numberOfSlotsPerFrame/10]modulo (1024×numberOfSlotsPerFrame)

where SFNstart time and slotstart time are the system frame number (SFN) and slot, respectively, of the first transmission of PDSCH where the configured downlink assignment was (re-)initialised."

In uplink, the timeslot of each transmission opportunity may be calculated according to Section 5.8.2 of 3GPP TS 38.321-f10:

"After an uplink grant is configured for a configured grant Type 2, the MAC entity shall consider sequentially that the $N^{th}$ uplink grant occurs associated with the symbol for which:

[(SFN×numberOfSlotsPerFrame×numberOfSymbolsPerSlot)+(slot number in the frame×numberOfSymbolsPerSlot)+symbol number in the slot]=[(SFN$_{start\ time}$×numberOfSlotsPerFrame× numberOfSymbolsPerSlot+slot$_{start\ time}$×numberOfSymbolsPerSlot+symbol$_{start\ time}$)+$N$×periodicity]modulo(1024×numberOfSlotsPerFrame× numberOfSymbolsPerSlot)

where SFN$_{start\ time}$, slot$_{start\ time}$, and symbol$_{start\ time}$ are the SFN, slot, and symbol, respectively, of the first transmission of PUSCH where the configured uplink grant was (re-)initialised."

In step 402, while SPS is active (i.e., the wireless device is configured with periodic resources as specified above), the network node initiates transmission of an SPS reconfiguration message to the wireless device. The SPS reconfiguration message comprises an instruction to reconfigure the wireless device to a second SPS configuration, which is different to the first SPS configuration (i.e. comprising one or more SPS parameters which differ from the parameters of the first SPS configuration). The SPS reconfiguration message may be transmitted using RRC signalling.

In some embodiments, the SPS reconfiguration message may be transmitted in a different hyper-frame to that in which the SPS was activated. In other embodiments, the SPS reconfiguration message may be transmitted in the same hyper-frame as that in which the SPS was activated.

In step 404, the network node provides an SPS activation time for the second SPS configuration to enable the wireless device to determine one or more transmission/reception opportunities associated with the second SPS configuration.

The SPS activation time associated with the second SPS configuration may vary in different embodiments of the disclosure.

In one embodiment, the SPS activation time associated with the second SPS configuration is the time at which a further SPS activation message is transmitted by the network node (e.g., subsequent to the SPS reconfiguration message), or a time specified in the further SPS activation message. In the latter case, the time may be specified as an absolute time, or a time relative to the time at which the SPS activation message was received (e.g., a specified amount of time after transmission of the SPS activation message). Relative time may be specified in any suitable units, such as OFDM symbols, TTIs, time slots, subframes, system frames, etc. Absolute time may similarly be specified in any suitable format, such as OFDM symbol number, TTI number, time slot number, subframe number system, system frame number, hyper-frame number, etc.

The SPS activation message may be transmitted by the network node via a downlink control channel, such as the physical downlink control channel. The SPS activation message may comprise DCI.

In another embodiment, the SPS activation time may be specified in or defined relative to the SPS reconfiguration message transmitted in step 402, e.g., without requiring an SPS activation message. In one embodiment, the SPS activation time may be the time at which the SPS reconfiguration message is received, or a predefined period of time thereafter. Alternatively, the SPS activation time may be specified within the SPS reconfiguration message itself, e.g., as an absolute time or a time relative to the time (e.g. a timing offset) at which the SPS reconfiguration message was received. The SPS activation time may be specified to a value which leaves sufficient time for the wireless device to process the SPS reconfiguration message before SPS activation according to the new, second SPS configuration.

In either embodiment, transmission/reception opportunities defined according to the first SPS configuration may continue to be calculated and used by the wireless device for transmission or reception of data up until the SPS activation time associated with the second SPS configuration. The benefit of this is that the wireless device can continue to be served with the existing SPS configuration until the second SPS configuration is activated. Thus, in these embodiments, step 206 takes place upon the SPS activation time associated with the second SPS configuration.

In alternative embodiments, transmission/reception opportunities defined according to the first SPS configuration may not be calculated and/or used by the wireless device for transmission or reception of data upon receipt of the SPS reconfiguration message in step 202. That is, the SPS is effectively or explicitly deactivated responsive to receipt of the SPS reconfiguration message. The deactivation may take place immediately upon receipt of the SPS reconfiguration message or a defined period thereafter. Thus in these embodiments, step 206 may take place upon reception of the SPS reconfiguration message in step 202 or shortly thereafter. The benefit of this is that ambiguity between the first and second SPS configurations is simply resolved without complex calculation or significant additional signalling. This method has the disadvantage that the wireless device is not provided with any transmission/reception opportunities for a period of time; however, this period of time can be made relatively short by activating SPS according to the second SPS configuration soon after the SPS reconfiguration (e.g., setting the SPS activation according to any of the methods set out above).

In embodiments without an additional SPS activation message, it will be noted that the resources (e.g., transmission frequencies, etc) to be used for the periodic transmission/reception opportunities according to the second SPS configuration may either remain the same as those used according to the first SPS configuration or, alternatively, be specified in the SPS reconfiguration message itself.

Figure 5:
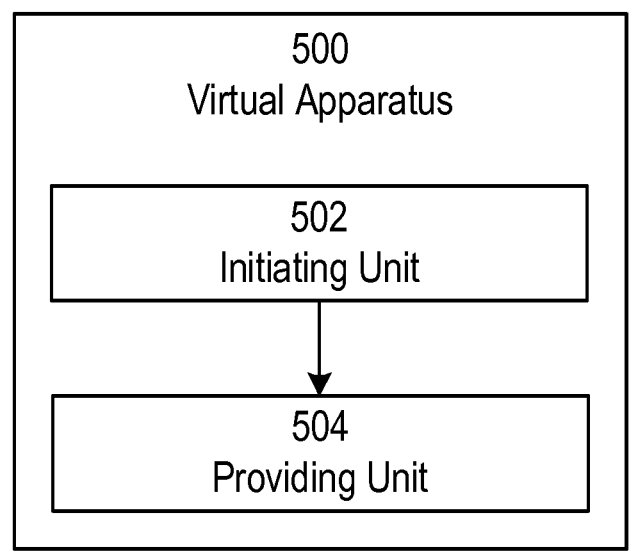
FIG. 5 is a schematic diagram of a network node according to embodiments of the disclosure.

FIG. 5 illustrates a schematic block diagram of an apparatus 500 in a wireless network (for example, the wireless network shown in FIG. 6). The apparatus may be implemented in a wireless device or network node (e.g., wireless device 610 or network node 660 shown in FIG. 6). Apparatus 500 is operable to carry out the example method described with reference to FIG. 4 and possibly any other processes or methods disclosed herein. It is also to be understood that the method of FIG. 4 is not necessarily carried out solely by apparatus 500. At least some operations of the method can be performed by one or more other entities.

Virtual Apparatus 500 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause initiating unit 502 and providing unit 504, and any other suitable units of apparatus 500 to perform corresponding functions according one or more embodiments of the present disclosure.

As illustrated in FIG. 5, apparatus 500 includes initiating unit 502 and providing unit 502. The initiating unit 502 is configured to initiate transmission of a semi-persistent scheduling reconfiguration message to the wireless device, the semi-persistent scheduling reconfiguration message comprising an instruction to reconfigure the wireless device to a second semi-persistent scheduling configuration for uplink or downlink transmissions. The providing unit Y04 is configured to provide a semi-persistent scheduling activation time for the second semi-persistent scheduling configuration, to enable the wireless device to determine one or more transmission or reception opportunities associated with the second semi-persistent scheduling configuration.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Although the subject matter described herein may be implemented in any appropriate type of system using any suitable components, the embodiments disclosed herein are described in relation to a wireless network, such as the example wireless network illustrated in FIG. 6. For simplicity, the wireless network of FIG. 6 only depicts network 606, network nodes 660 and 660b, and WDs 610, 610b, and 610c.

In practice, a wireless network may further include any additional elements suitable to support communication between wireless devices or between a wireless device and another communication device, such as a landline telephone, a service provider, or any other network node or end device. Of the illustrated components, network node 660 and wireless device (WD) 610 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or Zig Bee standards.

Network 606 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 660 and WD 610 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio.

Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 6, network node 660 includes processing circuitry 670, device readable medium 680, interface 690, auxiliary equipment 684, power source 686, power circuitry 687, and antenna 662. Although network node 660 illustrated in the example wireless network of FIG. 6 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 660 are depicted as single boxes located within a larger box, or nested within multiple boxes, in practice, a network node may comprise multiple different physical components that make up a single illustrated component (e.g., device readable medium 680 may comprise multiple separate hard drives as well as multiple RAM modules).

Similarly, network node 660 may be composed of multiple physically separate components (e.g., a NodeB component and a RNC component, or a BTS component and a BSC component, etc.), which may each have their own respective components. In certain scenarios in which network node 660 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 660 may be configured to support multiple radio access technologies (RATs). In such embodiments, some components may be duplicated (e.g., separate device readable medium 680 for the different RATs) and some components may be reused (e.g., the same antenna 662 may be shared by the RATs). Network node 660 may also include multiple sets of the various illustrated components for different wireless technologies integrated into network node 660, such as, for example, GSM, WCDMA, LTE, NR, WiFi, or Bluetooth wireless technologies. These wireless technologies may be integrated into the same or different chip or set of chips and other components within network node 660.

Processing circuitry 670 is configured to perform any determining, calculating, or similar operations (e.g., certain obtaining operations) described herein as being provided by a network node. These operations performed by processing circuitry 670 may include processing information obtained by processing circuitry 670 by, for example, converting the obtained information into other information, comparing the obtained information or converted information to information stored in the network node, and/or performing one or more operations based on the obtained information or converted information, and as a result of said processing making a determination.

Processing circuitry 670 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 660 components, such as device readable medium 680, network node 660 functionality. For example, processing circuitry 670 may execute instructions stored in device readable medium 680 or in memory within processing circuitry 670. Such functionality may include providing any of the various wireless features, functions, or benefits discussed herein. In some embodiments, processing circuitry 670 may include a system on a chip (SOC).

In some embodiments, processing circuitry 670 may include one or more of radio frequency (RF) transceiver circuitry 672 and baseband processing circuitry 674. In some embodiments, radio frequency (RF) transceiver circuitry 672 and baseband processing circuitry 674 may be on separate chips (or sets of chips), boards, or units, such as radio units and digital units. In alternative embodiments, part or all of RF transceiver circuitry 672 and baseband processing circuitry 674 may be on the same chip or set of chips, boards, or units In certain embodiments, some or all of the functionality described herein as being provided by a network node, base station, eNB or other such network device may be performed by processing circuitry 670 executing instructions stored on device readable medium 680 or memory within processing circuitry 670. In alternative embodiments, some or all of the functionality may be provided by processing circuitry 670 without executing instructions stored on a separate or discrete device readable medium, such as in a hard-wired manner. In any of those embodiments, whether executing instructions stored on a device readable storage medium or not, processing circuitry 670 can be configured to perform the described functionality. The benefits provided by such functionality are not limited to processing circuitry 670 alone or to other components of network node 660, but are enjoyed by network node 660 as a whole, and/or by end users and the wireless network generally.

Device readable medium 680 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 670. Device readable medium 680 may store any suitable instructions, data or information, including a computer program, software, an application including one or more of logic, rules, code, tables, etc. and/or other instructions capable of being executed by processing circuitry 670 and, utilized by network node 660. Device readable medium 680 may be used to store any calculations made by processing circuitry 670 and/or any data received via interface 690. In some embodiments, processing circuitry 670 and device readable medium 680 may be considered to be integrated.

Interface 690 is used in the wired or wireless communication of signalling and/or data between network node 660, network 606, and/or WDs 610. As illustrated, interface 690 comprises port(s)/terminal(s) 694 to send and receive data, for example to and from network 606 over a wired connection. Interface 690 also includes radio front end circuitry 692 that may be coupled to, or in certain embodiments a part of, antenna 662. Radio front end circuitry 692 comprises filters 698 and amplifiers 696. Radio front end circuitry 692 may be connected to antenna 662 and processing circuitry 670. Radio front end circuitry may be configured to condition signals communicated between antenna 662 and processing circuitry 670. Radio front end circuitry 692 may receive digital data that is to be sent out to other network nodes or WDs via a wireless connection. Radio front end circuitry 692 may convert the digital data into a radio signal having the appropriate channel and bandwidth parameters using a combination of filters 698 and/or amplifiers 696. The radio signal may then be transmitted via antenna 662. Similarly, when receiving data, antenna 662 may collect radio signals which are then converted into digital data by radio front end circuitry 692. The digital data may be passed to processing circuitry 670. In other embodiments, the interface may comprise different components and/or different combinations of components.

In certain alternative embodiments, network node 660 may not include separate radio front end circuitry 692, instead, processing circuitry 670 may comprise radio front end circuitry and may be connected to antenna 662 without separate radio front end circuitry 692. Similarly, in some embodiments, all or some of RF transceiver circuitry 672 may be considered a part of interface 690. In still other embodiments, interface 690 may include one or more ports or terminals 694, radio front end circuitry 692, and RF transceiver circuitry 672, as part of a radio unit (not shown), and interface 690 may communicate with baseband processing circuitry 674, which is part of a digital unit (not shown).

Antenna 662 may include one or more antennas, or antenna arrays, configured to send and/or receive wireless signals. Antenna 662 may be coupled to radio front end circuitry 690 and may be any type of antenna capable of transmitting and receiving data and/or signals wirelessly. In some embodiments, antenna 662 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 662 may be separate from network node 660 and may be connectable to network node 660 through an interface or port.

Antenna 662, interface 690, and/or processing circuitry 670 may be configured to perform any receiving operations and/or certain obtaining operations described herein as being performed by a network node. Any information, data and/or signals may be received from a wireless device, another network node and/or any other network equipment. Similarly, antenna 662, interface 690, and/or processing circuitry 670 may be configured to perform any transmitting operations described herein as being performed by a network node. Any information, data and/or signals may be transmitted to a wireless device, another network node and/or any other network equipment.

Power circuitry 687 may comprise, or be coupled to, power management circuitry and is configured to supply the components of network node 660 with power for performing the functionality described herein. Power circuitry 687 may receive power from power source 686. Power source 686 and/or power circuitry 687 may be configured to provide power to the various components of network node 660 in a form suitable for the respective components (e.g., at a voltage and current level needed for each respective component). Power source 686 may either be included in, or external to, power circuitry 687 and/or network node 660. For example, network node 660 may be connectable to an external power source (e.g., an electricity outlet) via an input circuitry or interface such as an electrical cable, whereby the external power source supplies power to power circuitry 687. As a further example, power source 686 may comprise a source of power in the form of a battery or battery pack which is connected to, or integrated in, power circuitry 687. The battery may provide backup power should the external power source fail. Other types of power sources, such as photovoltaic devices, may also be used.

Alternative embodiments of network node 660 may include additional components beyond those shown in FIG. 6 that may be responsible for providing certain aspects of the network node's functionality, including any of the functionality described herein and/or any functionality necessary to support the subject matter described herein. For example, network node 660 may include user interface equipment to allow input of information into network node 660 and to allow output of information from network node 660. This may allow a user to perform diagnostic, maintenance, repair, and other administrative functions for network node 660.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 610 includes antenna 611, interface 614, processing circuitry 620, device readable medium 630, user interface equipment 632, auxiliary equipment 634, power source 636 and power circuitry 637. WD 610 may include multiple sets of one or more of the illustrated components for different wireless technologies supported by WD 610, such as, for example, GSM, WCDMA, LTE, NR, WiFi, WiMAX, or Bluetooth wireless technologies, just to mention a few. These wireless technologies may be integrated into the same or different chips or set of chips as other components within WD 610.

Antenna 611 may include one or more antennas or antenna arrays, configured to send and/or receive wireless signals, and is connected to interface 614. In certain alternative embodiments, antenna 611 may be separate from WD 610 and be connectable to WD 610 through an interface or port. Antenna 611, interface 614, and/or processing circuitry 620 may be configured to perform any receiving or transmitting operations described herein as being performed by a WD. Any information, data and/or signals may be received from a network node and/or another WD. In some embodiments, radio front end circuitry and/or antenna 611 may be considered an interface.

As illustrated, interface 614 comprises radio front end circuitry 612 and antenna 611. Radio front end circuitry 612 comprise one or more filters 618 and amplifiers 616. Radio front end circuitry 614 is connected to antenna 611 and processing circuitry 620, and is configured to condition signals communicated between antenna 611 and processing circuitry 620. Radio front end circuitry 612 may be coupled to or a part of antenna 611. In some embodiments, WD 610 may not include separate radio front end circuitry 612; rather, processing circuitry 620 may comprise radio front end circuitry and may be connected to antenna 611. Similarly, in some embodiments, some or all of RF transceiver circuitry 622 may be considered a part of interface 614. Radio front end circuitry 612 may receive digital data that is to be sent out to other network nodes or WDs via a wireless connection. Radio front end circuitry 612 may convert the digital data into a radio signal having the appropriate channel and bandwidth parameters using a combination of filters 618 and/or amplifiers 616. The radio signal may then be transmitted via antenna 611. Similarly, when receiving data, antenna 611 may collect radio signals which are then converted into digital data by radio front end circuitry 612. The digital data may be passed to processing circuitry 620. In other embodiments, the interface may comprise different components and/or different combinations of components.

Processing circuitry 620 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 610 components, such as device readable medium 630, WD 610 functionality. Such functionality may include providing any of the various wireless features or benefits discussed herein. For example, processing circuitry 620 may execute instructions stored in device readable medium 630 or in memory within processing circuitry 620 to provide the functionality disclosed herein.

As illustrated, processing circuitry 620 includes one or more of RF transceiver circuitry 622, baseband processing circuitry 624, and application processing circuitry 626. In other embodiments, the processing circuitry may comprise different components and/or different combinations of components. In certain embodiments processing circuitry 620 of WD 610 may comprise a SOC. In some embodiments, RF transceiver circuitry 622, baseband processing circuitry 624, and application processing circuitry 626 may be on separate chips or sets of chips. In alternative embodiments, part or all of baseband processing circuitry 624 and application processing circuitry 626 may be combined into one chip or set of chips, and RF transceiver circuitry 622 may be on a separate chip or set of chips. In still alternative embodiments, part or all of RF transceiver circuitry 622 and baseband processing circuitry 624 may be on the same chip or set of chips, and application processing circuitry 626 may be on a separate chip or set of chips. In yet other alternative embodiments, part or all of RF transceiver circuitry 622, baseband processing circuitry 624, and application processing circuitry 626 may be combined in the same chip or set of chips. In some embodiments, RF transceiver circuitry 622 may be a part of interface 614. RF transceiver circuitry 622 may condition RF signals for processing circuitry 620.

In certain embodiments, some or all of the functionality described herein as being performed by a WD may be provided by processing circuitry 620 executing instructions stored on device readable medium 630, which in certain embodiments may be a computer-readable storage medium. In alternative embodiments, some or all of the functionality may be provided by processing circuitry 620 without executing instructions stored on a separate or discrete device readable storage medium, such as in a hard-wired manner. In any of those particular embodiments, whether executing instructions stored on a device readable storage medium or not, processing circuitry 620 can be configured to perform the described functionality. The benefits provided by such functionality are not limited to processing circuitry 620 alone or to other components of WD 610, but are enjoyed by WD 610 as a whole, and/or by end users and the wireless network generally.

Processing circuitry 620 may be configured to perform any determining, calculating, or similar operations (e.g., certain obtaining operations) described herein as being performed by a WD. These operations, as performed by processing circuitry 620, may include processing information obtained by processing circuitry 620 by, for example, converting the obtained information into other information, comparing the obtained information or converted information to information stored by WD 610, and/or performing one or more operations based on the obtained information or converted information, and as a result of said processing making a determination.

Device readable medium 630 may be operable to store a computer program, software, an application including one or more of logic, rules, code, tables, etc. and/or other instructions capable of being executed by processing circuitry 620. Device readable medium 630 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 620. In some embodiments, processing circuitry 620 and device readable medium 630 may be considered to be integrated.

User interface equipment 632 may provide components that allow for a human user to interact with WD 610. Such interaction may be of many forms, such as visual, audial, tactile, etc. User interface equipment 632 may be operable to produce output to the user and to allow the user to provide input to WD 610. The type of interaction may vary depending on the type of user interface equipment 632 installed in WD 610. For example, if WD 610 is a smart phone, the interaction may be via a touch screen; if WD 610 is a smart meter, the interaction may be through a screen that provides usage (e.g., the number of gallons used) or a speaker that provides an audible alert (e.g., if smoke is detected). User interface equipment 632 may include input interfaces, devices and circuits, and output interfaces, devices and circuits. User interface equipment 632 is configured to allow input of information into WD 610, and is connected to processing circuitry 620 to allow processing circuitry 620 to process the input information. User interface equipment 632 may include, for example, a microphone, a proximity or other sensor, keys/buttons, a touch display, one or more cameras, a USB port, or other input circuitry. User interface equipment 632 is also configured to allow output of information from WD 610, and to allow processing circuitry 620 to output information from WD 610. User interface equipment 632 may include, for example, a speaker, a display, vibrating circuitry, a USB port, a headphone interface, or other output circuitry. Using one or more input and output interfaces, devices, and circuits, of user interface equipment 632, WD 610 may communicate with end users and/or the wireless network, and allow them to benefit from the functionality described herein.

Auxiliary equipment 634 is operable to provide more specific functionality which may not be generally performed by WDs. This may comprise specialized sensors for doing measurements for various purposes, interfaces for additional types of communication such as wired communications etc. The inclusion and type of components of auxiliary equipment 634 may vary depending on the embodiment and/or scenario.

Power source 636 may, in some embodiments, be in the form of a battery or battery pack. Other types of power sources, such as an external power source (e.g., an electricity outlet), photovoltaic devices or power cells, may also be used. WD 610 may further comprise power circuitry 637 for delivering power from power source 636 to the various parts of WD 610 which need power from power source 636 to carry out any functionality described or indicated herein. Power circuitry 637 may in certain embodiments comprise power management circuitry. Power circuitry 637 may additionally or alternatively be operable to receive power from an external power source; in which case WD 610 may be connectable to the external power source (such as an electricity outlet) via input circuitry or an interface such as an electrical power cable. Power circuitry 637 may also in certain embodiments be operable to deliver power from an external power source to power source 636. This may be, for example, for the charging of power source 636. Power circuitry 637 may perform any formatting, converting, or other modification to the power from power source 636 to make the power suitable for the respective components of WD 610 to which power is supplied.

Figure 7:
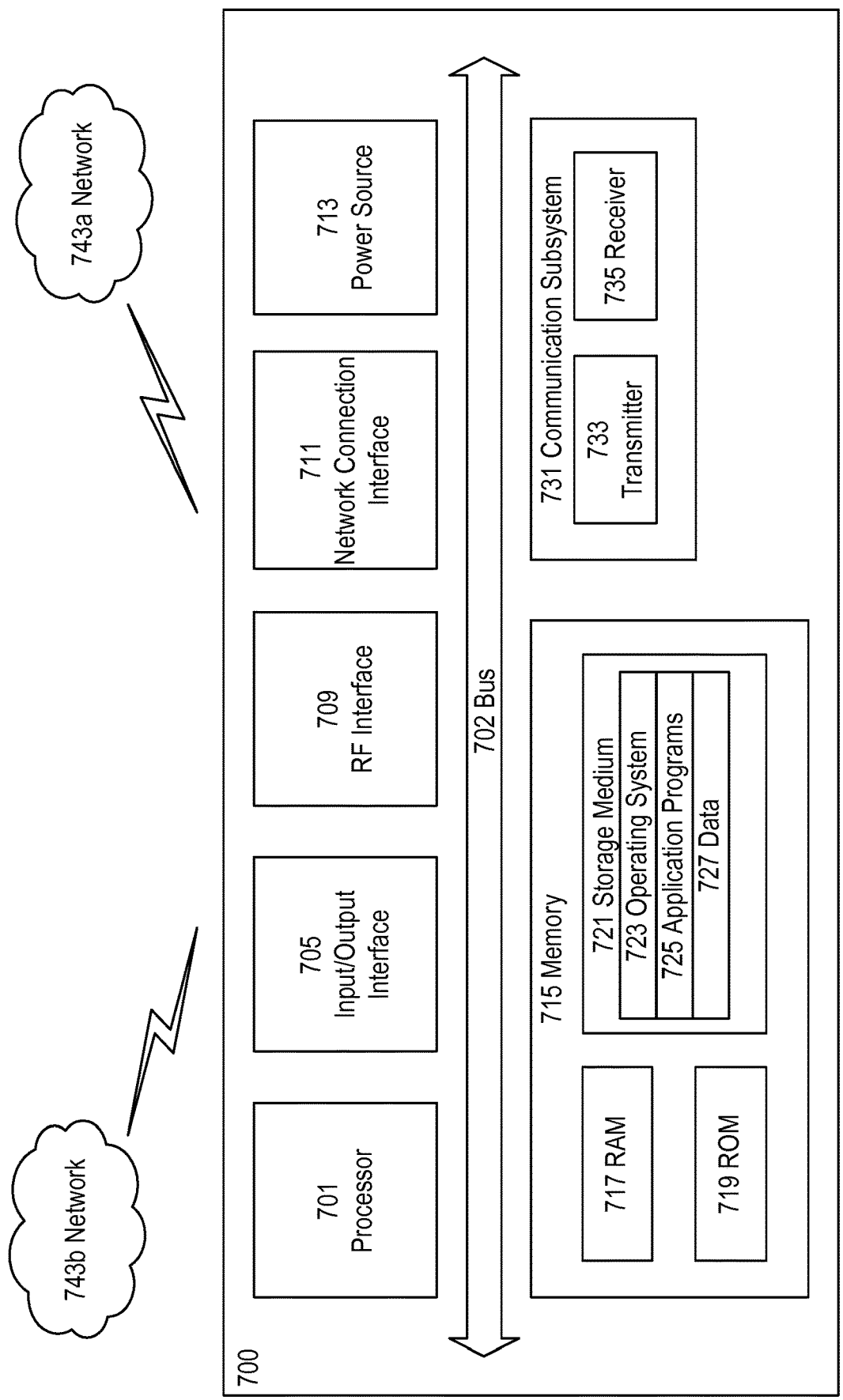
FIG. 7 shows a user equipment according to embodiments of the disclosure.

FIG. 7 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 7200 may be any UE identified by the $3^{rd}$ Generation Partnership Project (3GPP), including a NB-IoT UE, a machine type communication (MTC) UE, and/or an enhanced MTC (eMTC) UE. UE 700, as illustrated in FIG. 7, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 7 is a UE, the components discussed herein are equally applicable to a WD, and vice-versa.

In FIG. 7, UE 700 includes processing circuitry 701 that is operatively coupled to input/output interface 705, radio frequency (RF) interface 709, network connection interface 711, memory 715 including random access memory (RAM) 717, read-only memory (ROM) 719, and storage medium 721 or the like, communication subsystem 731, power source 733, and/or any other component, or any combination thereof. Storage medium 721 includes operating system 723, application program 725, and data 727. In other embodiments, storage medium 721 may include other similar types of information. Certain UEs may utilize all of the components shown in FIG. 7, or only a subset of the components. The level of integration between the components may vary from one UE to another UE. Further, certain UEs may contain multiple instances of a component, such as multiple processors, memories, transceivers, transmitters, receivers, etc.

In FIG. 7, processing circuitry 701 may be configured to process computer instructions and data. Processing circuitry 701 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 701 may include two central processing units (CPUs). Data may be information in a form suitable for use by a computer.

In the depicted embodiment, input/output interface 705 may be configured to provide a communication interface to an input device, output device, or input and output device. UE 700 may be configured to use an output device via input/output interface 705. An output device may use the same type of interface port as an input device. For example, a USB port may be used to provide input to and output from UE 700. The output device may be a speaker, a sound card, a video card, a display, a monitor, a printer, an actuator, an emitter, a smartcard, another output device, or any combination thereof. UE 700 may be configured to use an input device via input/output interface 705 to allow a user to capture information into UE 700. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 7, RF interface 709 may be configured to provide a communication interface to RF components such as a transmitter, a receiver, and an antenna. Network connection interface 711 may be configured to provide a communication interface to network 743a. Network 743a may encompass wired and/or wireless networks such as a local-area network (LAN), a wide-area network (WAN), a computer network, a wireless network, a telecommunications network, another like network or any combination thereof. For example, network 743a may comprise a Wi-Fi network. Network connection interface 711 may be configured to include a receiver and a transmitter interface used to communicate with one or more other devices over a communication network according to one or more communication protocols, such as Ethernet, TCP/IP, SONET, ATM, or the like. Network connection interface 711 may implement receiver and transmitter functionality appropriate to the communication network links (e.g., optical, electrical, and the like). The transmitter and receiver functions may share circuit components, software or firmware, or alternatively may be implemented separately.

RAM 717 may be configured to interface via bus 702 to processing circuitry 701 to provide storage or caching of data or computer instructions during the execution of software programs such as the operating system, application programs, and device drivers. ROM 719 may be configured to provide computer instructions or data to processing circuitry 701. For example, ROM 719 may be configured to store invariant low-level system code or data for basic system functions such as basic input and output (I/O), startup, or reception of keystrokes from a keyboard that are stored in a non-volatile memory. Storage medium 721 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 721 may be configured to include operating system 723, application program 725 such as a web browser application, a widget or gadget engine or another application, and data file 727. Storage medium 721 may store, for use by UE 700, any of a variety of various operating systems or combinations of operating systems.

Storage medium 721 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 721 may allow UE 700 to access computer-executable instructions, application programs or the like, stored on transitory or non-transitory memory media, to off-load data, or to upload data. An article of manufacture, such as one utilizing a communication system may be tangibly embodied in storage medium 721, which may comprise a device readable medium.

In FIG. 7, processing circuitry 701 may be configured to communicate with network 743b using communication subsystem 731. Network 743a and network 743b may be the same network or networks or different network or networks. Communication subsystem 731 may be configured to include one or more transceivers used to communicate with network 743b. For example, communication subsystem 731 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 733 and/or receiver 735 to implement transmitter or receiver functionality, respectively, appropriate to the RAN links (e.g., frequency allocations and the like). Further, transmitter 733 and receiver 735 of each transceiver may share circuit components, software or firmware, or alternatively may be implemented separately.

In the illustrated embodiment, the communication functions of communication subsystem 731 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 731 may include cellular communication, Wi-Fi communication, Bluetooth communication, and GPS communication. Network 743b may encompass wired and/or wireless networks such as a local-area network (LAN), a wide-area network (WAN), a computer network, a wireless network, a telecommunications network, another like network or any combination thereof. For example, network 743b may be a cellular network, a Wi-Fi network, and/or a near-field network. Power source 713 may be configured to provide alternating current (AC) or direct current (DC) power to components of UE 700.

The features, benefits and/or functions described herein may be implemented in one of the components of UE 700 or partitioned across multiple components of UE 700. Further, the features, benefits, and/or functions described herein may be implemented in any combination of hardware, software or firmware. In one example, communication subsystem 731 may be configured to include any of the components described herein. Further, processing circuitry 701 may be configured to communicate with any of such components over bus 702. In another example, any of such components may be represented by program instructions stored in memory that when executed by processing circuitry 701 perform the corresponding functions described herein. In another example, the functionality of any of such components may be partitioned between processing circuitry 701 and communication subsystem 731. In another example, the non-computationally intensive functions of any of such components may be implemented in software or firmware and the computationally intensive functions may be implemented in hardware.

Figure 8:
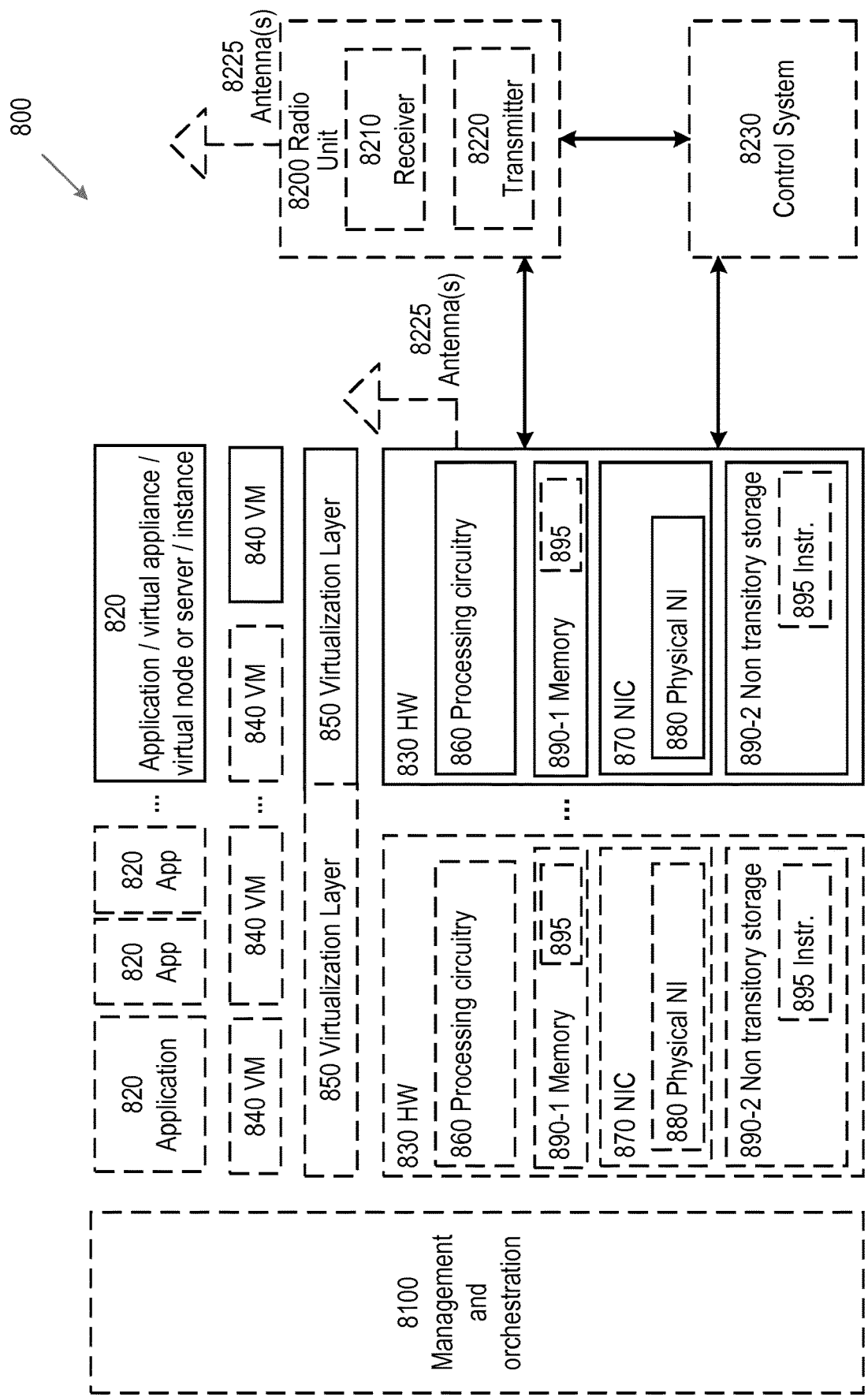
FIG. 8 shows a virtualization environment according to embodiments of the disclosure.

FIG. 8 is a schematic block diagram illustrating a virtualization environment 800 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 800 hosted by one or more of hardware nodes 830. Further, in embodiments in which the virtual node is not a radio access node or does not require radio connectivity (e.g., a core network node), then the network node may be entirely virtualized.

The functions may be implemented by one or more applications 820 (which may alternatively be called software instances, virtual appliances, network functions, virtual nodes, virtual network functions, etc.) operative to implement some of the features, functions, and/or benefits of some of the embodiments disclosed herein. Applications 820 are run in virtualization environment 800 which provides hardware 830 comprising processing circuitry 860 and memory 890. Memory 890 contains instructions 895 executable by processing circuitry 860 whereby application 820 is operative to provide one or more of the features, benefits, and/or functions disclosed herein.

Virtualization environment 800, comprises general-purpose or special-purpose network hardware devices 830 comprising a set of one or more processors or processing circuitry 860, which may be commercial off-the-shelf (COTS) processors, dedicated Application Specific Integrated Circuits (ASICs), or any other type of processing circuitry including digital or analog hardware components or special purpose processors. Each hardware device may comprise memory 890-1 which may be non-persistent memory for temporarily storing instructions 895 or software executed by processing circuitry 860. Each hardware device may comprise one or more network interface controllers (NICs) 870, also known as network interface cards, which include physical network interface 880. Each hardware device may also include non-transitory, persistent, machine-readable storage media 890-2 having stored therein software 895 and/or instructions executable by processing circuitry 860. Software 895 may include any type of software including software for instantiating one or more virtualization layers 850 (also referred to as hypervisors), software to execute virtual machines 840 as well as software allowing it to execute functions, features and/or benefits described in relation with some embodiments described herein.

Virtual machines 840, comprise virtual processing, virtual memory, virtual networking or interface and virtual storage, and may be run by a corresponding virtualization layer 850 or hypervisor. Different embodiments of the instance of virtual appliance 820 may be implemented on one or more of virtual machines 840, and the implementations may be made in different ways.

During operation, processing circuitry 860 executes software 895 to instantiate the hypervisor or virtualization layer 850, which may sometimes be referred to as a virtual machine monitor (VMM). Virtualization layer 850 may present a virtual operating platform that appears like networking hardware to virtual machine 840.

As shown in FIG. 8, hardware 830 may be a standalone network node with generic or specific components. Hardware 830 may comprise antenna 8225 and may implement some functions via virtualization. Alternatively, hardware 830 may be part of a larger cluster of hardware (e.g. such as in a data center or customer premise equipment (CPE)) where many hardware nodes work together and are managed via management and orchestration (MANO) 8100, which, among others, oversees lifecycle management of applications 820.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 840 may be a software implementation of a physical machine that runs programs as if they were executing on a physical, non-virtualized machine. Each of virtual machines 840, and that part of hardware 830 that executes that virtual machine, be it hardware dedicated to that virtual machine and/or hardware shared by that virtual machine with others of the virtual machines 840, forms a separate virtual network elements (VNE).

Still in the context of NFV, Virtual Network Function (VNF) is responsible for handling specific network functions that run in one or more virtual machines 840 on top of hardware networking infrastructure 830 and corresponds to application 820 in FIG. 8.

In some embodiments, one or more radio units 8200 that each include one or more transmitters 8220 and one or more receivers 8210 may be coupled to one or more antennas 8225. Radio units 8200 may communicate directly with hardware nodes 830 via one or more appropriate network interfaces and may be used in combination with the virtual components to provide a virtual node with radio capabilities, such as a radio access node or a base station.

In some embodiments, some signalling can be effected with the use of control system 8230 which may alternatively be used for communication between the hardware nodes 830 and radio units 8200.

Figure 9:
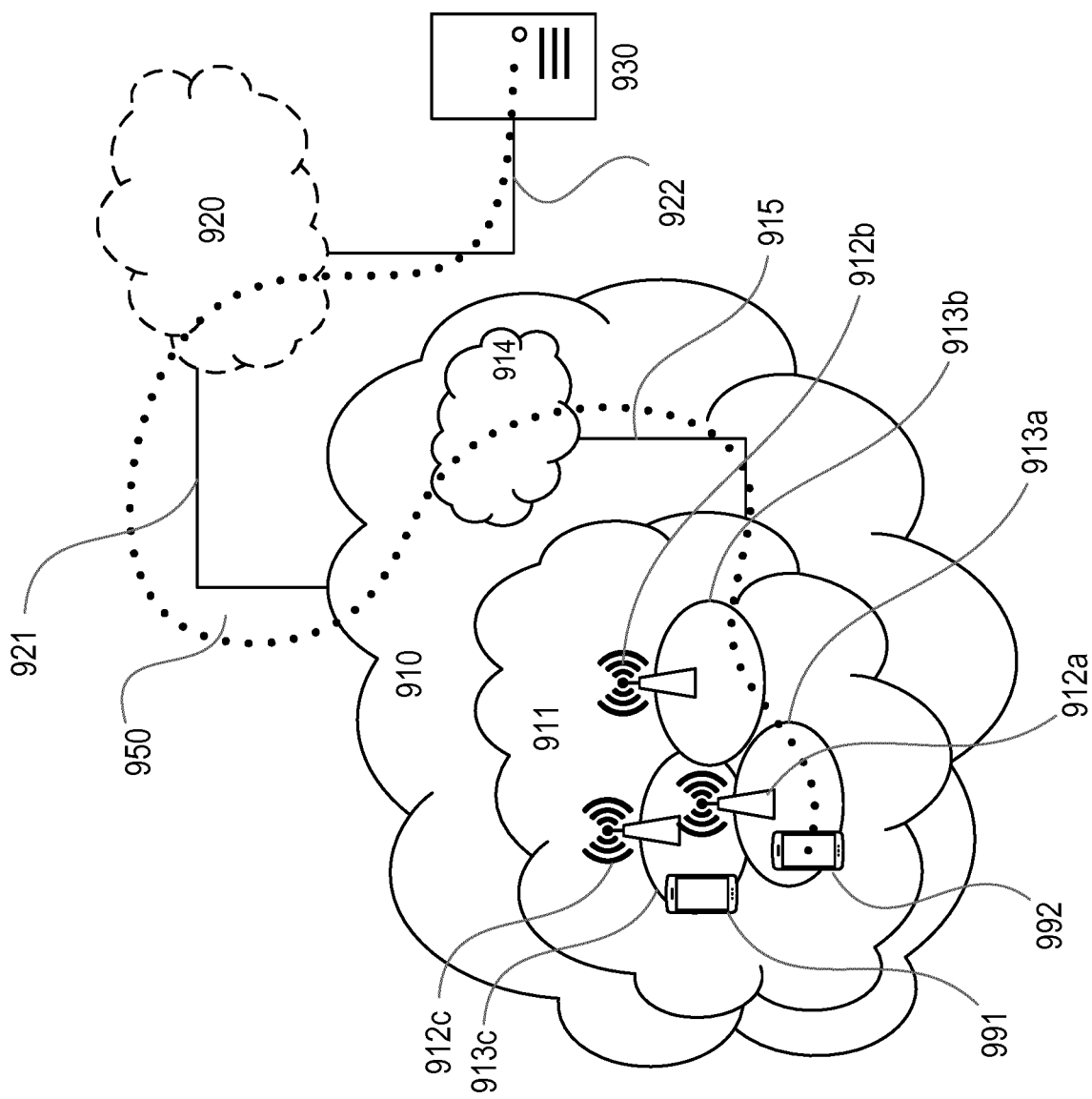
FIG. 9 shows a telecommunication network connected via an intermediate network to a host computer, according to embodiments of the disclosure.

With reference to FIG. 9, in accordance with an embodiment, a communication system includes telecommunication network 910, such as a 3GPP-type cellular network, which comprises access network 911, such as a radio access network, and core network 914. Access network 911 comprises a plurality of base stations 912*a*, 912*b*, 912*c*, such as NBs, eNBs, gNBs or other types of wireless access points, each defining a corresponding coverage area 913*a*, 913*b*, 913*c*. Each base station 912*a*, 912*b*, 912*c* is connectable to core network 914 over a wired or wireless connection 915. A first UE 991 located in coverage area 913*c* is configured to wirelessly connect to, or be paged by, the corresponding base station 912*c*. A second UE 992 in coverage area 913*a* is wirelessly connectable to the corresponding base station 912*a*. While a plurality of UEs 991, 992 are illustrated in this example, the disclosed embodiments are equally applicable to a situation where a sole UE is in the coverage area or where a sole UE is connecting to the corresponding base station 912.

Telecommunication network 910 is itself connected to host computer 930, which may be embodied in the hardware and/or software of a standalone server, a cloud-implemented server, a distributed server or as processing resources in a server farm. Host computer 930 may be under the ownership or control of a service provider, or may be operated by the service provider or on behalf of the service provider. Connections 921 and 922 between telecommunication network 910 and host computer 930 may extend directly from core network 914 to host computer 930 or may go via an optional intermediate network 920. Intermediate network 920 may be one of, or a combination of more than one of, a public, private or hosted network; intermediate network 920, if any, may be a backbone network or the Internet; in particular, intermediate network 920 may comprise two or more sub-networks (not shown).

The communication system of FIG. 9 as a whole enables connectivity between the connected UEs 991, 992 and host computer 930. The connectivity may be described as an over-the-top (OTT) connection 950. Host computer 930 and the connected UEs 991, 992 are configured to communicate data and/or signaling via OTT connection 950, using access network 911, core network 914, any intermediate network 920 and possible further infrastructure (not shown) as intermediaries. OTT connection 950 may be transparent in the sense that the participating communication devices through which OTT connection 950 passes are unaware of routing of uplink and downlink communications. For example, base station 912 may not or need not be informed about the past routing of an incoming downlink communication with data originating from host computer 930 to be forwarded (e.g., handed over) to a connected UE 991. Similarly, base station 912 need not be aware of the future routing of an outgoing uplink communication originating from the UE 991 towards the host computer 930.

Example implementations, in accordance with an embodiment, of the UE, base station and host computer discussed in the preceding paragraphs will now be described with reference to FIG. 10. In communication system 1000, host computer 1010 comprises hardware 1015 including communication interface 1016 configured to set up and maintain a wired or wireless connection with an interface of a different communication device of communication system 1000. Host computer 1010 further comprises processing circuitry 1018, which may have storage and/or processing capabilities. In particular, processing circuitry 1018 may comprise one or more programmable processors, application-specific integrated circuits, field programmable gate arrays or combinations of these (not shown) adapted to execute instructions. Host computer 1010 further comprises software 1011, which is stored in or accessible by host computer 1010 and executable by processing circuitry 1018. Software 1011 includes host application 1012. Host application 1012 may be operable to provide a service to a remote user, such as UE 1030 connecting via OTT connection 1050 terminating at UE 1030 and host computer 1010. In providing the service to the remote user, host application 1012 may provide user data which is transmitted using OTT connection 1050.

Communication system 1000 further includes base station 1020 provided in a telecommunication system and comprising hardware 1025 enabling it to communicate with host computer 1010 and with UE 1030. Hardware 1025 may include communication interface 1026 for setting up and maintaining a wired or wireless connection with an interface of a different communication device of communication system 1000, as well as radio interface 1027 for setting up and maintaining at least wireless connection 1070 with UE 1030 located in a coverage area (not shown in FIG. 10) served by base station 1020. Communication interface 1026 may be configured to facilitate connection 1060 to host computer 1010. Connection 1060 may be direct or it may pass through a core network (not shown in FIG. 10) of the telecommunication system and/or through one or more intermediate networks outside the telecommunication system. In the embodiment shown, hardware 1025 of base station 1020 further includes processing circuitry 1028, which may comprise one or more programmable processors, application-specific integrated circuits, field programmable gate arrays or combinations of these (not shown) adapted to execute instructions. Base station 1020 further has software 1021 stored internally or accessible via an external connection.

Communication system 1000 further includes UE 1030 already referred to. Its hardware 1035 may include radio interface 1037 configured to set up and maintain wireless connection 1070 with a base station serving a coverage area in which UE 1030 is currently located. Hardware 1035 of UE 1030 further includes processing circuitry 1038, which may comprise one or more programmable processors, application-specific integrated circuits, field programmable gate arrays or combinations of these (not shown) adapted to execute instructions. UE 1030 further comprises software 1031, which is stored in or accessible by UE 1030 and executable by processing circuitry 1038. Software 1031 includes client application 1032. Client application 1032 may be operable to provide a service to a human or non-human user via UE 1030, with the support of host computer 1010. In host computer 1010, an executing host application 1012 may communicate with the executing client application 1032 via OTT connection 1050 terminating at UE 1030 and host computer 1010. In providing the service to the user, client application 1032 may receive request data from host application 1012 and provide user data in response to the request data. OTT connection 1050 may transfer both the request data and the user data. Client application 1032 may interact with the user to generate the user data that it provides.

Figure 10:
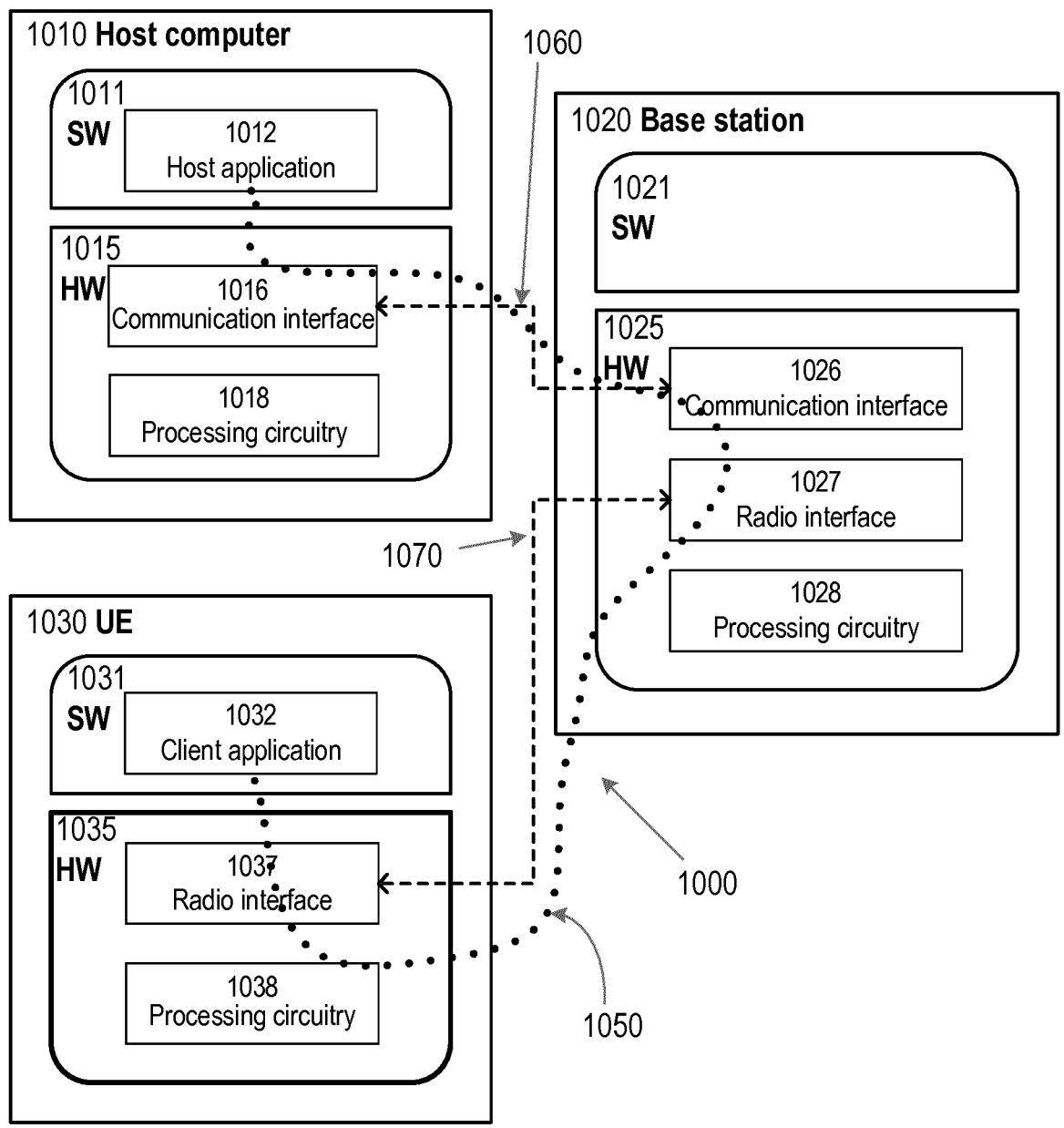
FIG. 10 shows a host computer communicating via a base station with a user equipment over a partially wireless connection, according to embodiments of the disclosure.

It is noted that host computer 1010, base station 1020 and UE 1030 illustrated in FIG. 10 may be similar or identical to host computer 930, one of base stations 912*a*, 912*b*, 912*c* and one of UEs 991, 992 of FIG. 9, respectively. This is to say, the inner workings of these entities may be as shown in FIG. 10 and independently, the surrounding network topology may be that of FIG. 9.

In FIG. 10, OTT connection 1050 has been drawn abstractly to illustrate the communication between host computer 1010 and UE 1030 via base station 1020, without explicit reference to any intermediary devices and the precise routing of messages via these devices. Network infrastructure may determine the routing, which it may be configured to hide from UE 1030 or from the service provider operating host computer 1010, or both. While OTT connection 1050 is active, the network infrastructure may further take decisions by which it dynamically changes the routing (e.g., on the basis of load balancing consideration or reconfiguration of the network).

Wireless connection 1070 between UE 1030 and base station 1020 is in accordance with the teachings of the embodiments described throughout this disclosure. One or more of the various embodiments improve the performance of OTT services provided to UE 1030 using OTT connection 1050, in which wireless connection 1070 forms the last segment. More precisely, the teachings of these embodiments may provide benefits such as greater flexibility to adapt scheduling to differing QoS requirements and thereby improve the latency or responsiveness associated with OTT services.

A measurement procedure may be provided for the purpose of monitoring data rate, latency and other factors on which the one or more embodiments improve. There may further be an optional network functionality for reconfiguring OTT connection 1050 between host computer 1010 and UE 1030, in response to variations in the measurement results. The measurement procedure and/or the network functionality for reconfiguring OTT connection 1050 may be implemented in software 1011 and hardware 1015 of host computer 1010 or in software 1031 and hardware 1035 of UE 1030, or both. In embodiments, sensors (not shown) may be deployed in or in association with communication devices through which OTT connection 1050 passes; the sensors may participate in the measurement procedure by supplying values of the monitored quantities exemplified above, or supplying values of other physical quantities from which software 1011, 1031 may compute or estimate the monitored quantities. The reconfiguring of OTT connection 1050 may include message format, retransmission settings, preferred routing etc.; the reconfiguring need not affect base station 1020, and it may be unknown or imperceptible to base station 1020. Such procedures and functionalities may be known and practiced in the art. In certain embodiments, measurements may involve proprietary UE signaling facilitating host computer 1010's measurements of throughput, propagation times, latency and the like. The measurements may be implemented in that software 1011 and 1031 causes messages to be transmitted, in particular empty or 'dummy' messages, using OTT connection 1050 while it monitors propagation times, errors etc.

Figure 11:
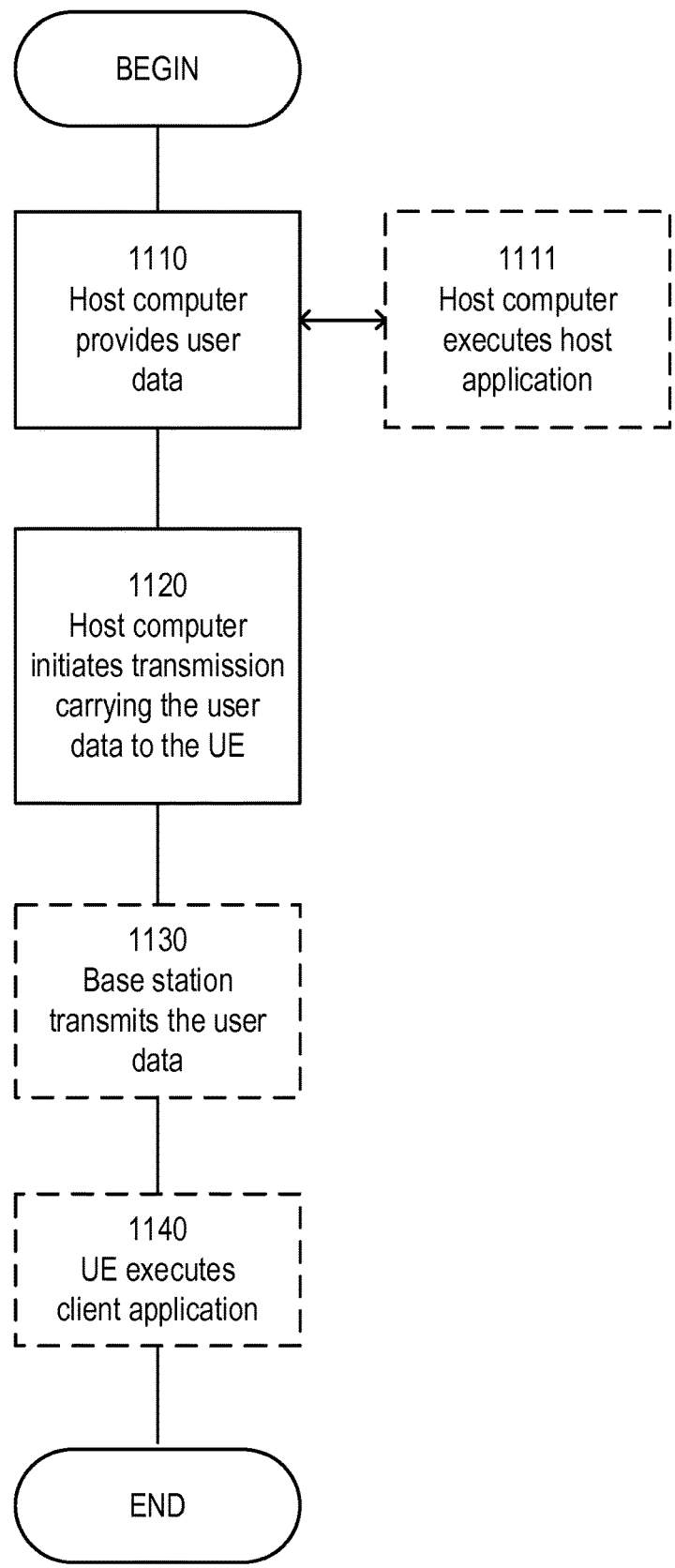
FIGS. 11 to 14 are flowcharts depicting methods in a communications system including a host computer, a base station and a user equipment, according to embodiments of the disclosure.

FIG. 11 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 11 will be included in this section. In step 1110, the host computer provides user data. In substep 1111 (which may be optional) of step 1110, the host computer provides the user data by executing a host application. In step 1120, the host computer initiates a transmission carrying the user data to the UE. In step 1130 (which may be optional), the base station transmits to the UE the user data which was carried in the transmission that the host computer initiated, in accordance with the teachings of the embodiments described throughout this disclosure. In step 1140 (which may also be optional), the UE executes a client application associated with the host application executed by the host computer.

Figure 12:
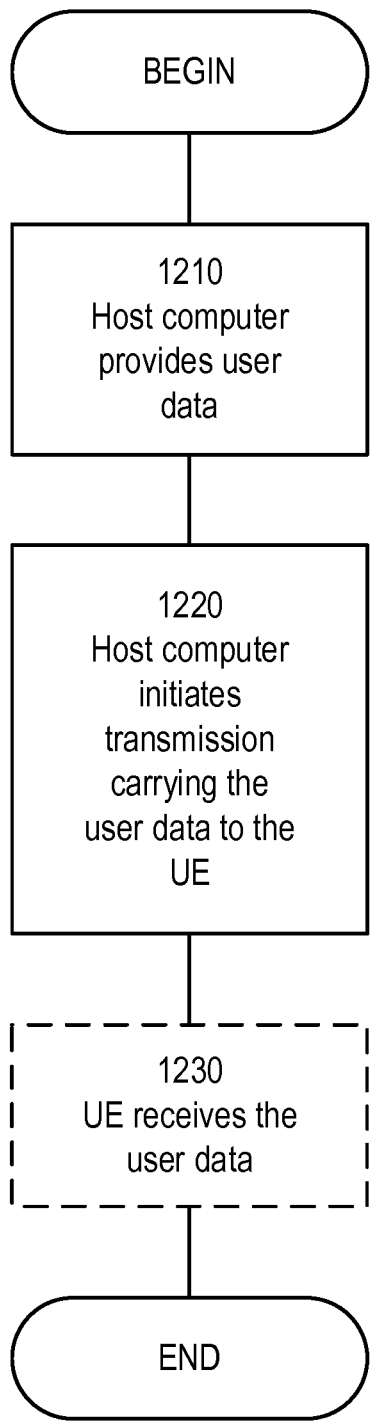

FIG. 12 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 12 will be included in this section. In step 1210 of the method, the host computer provides user data. In an optional substep (not shown) the host computer provides the user data by executing a host application. In step 1220, the host computer initiates a transmission carrying the user data to the UE. The transmission may pass via the base station, in accordance with the teachings of the embodiments described throughout this disclosure. In step 1230 (which may be optional), the UE receives the user data carried in the transmission.

Figure 13:
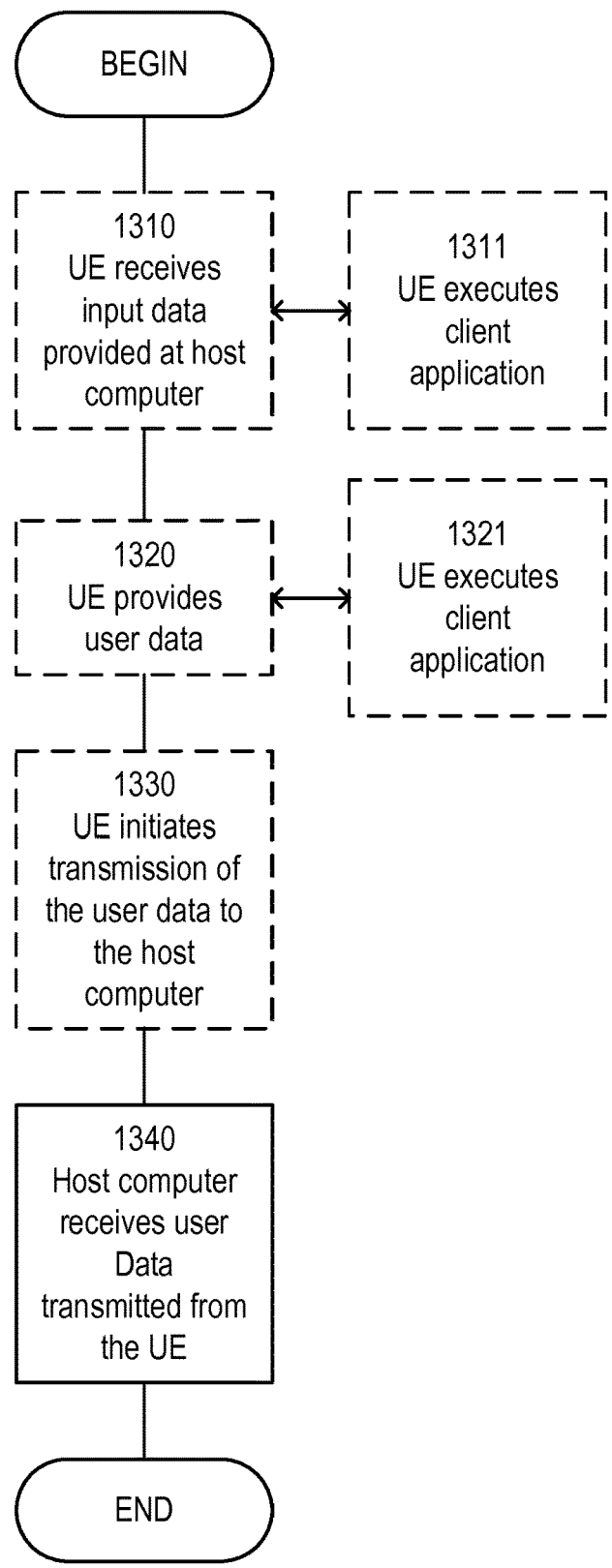

FIG. 13 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 13 will be included in this section. In step 1310 (which may be optional), the UE receives input data provided by the host computer. Additionally or alternatively, in step 1320, the UE provides user data. In substep 1321 (which may be optional) of step 1320, the UE provides the user data by executing a client application. In substep 1311 (which may be optional) of step 1310, the UE executes a client application which provides the user data in reaction to the received input data provided by the host computer. In providing the user data, the executed client application may further consider user input received from the user. Regardless of the specific manner in which the user data was provided, the UE initiates, in substep 1330 (which may be optional), transmission of the user data to the host computer. In step 1340 of the method, the host computer receives the user data transmitted from the UE, in accordance with the teachings of the embodiments described throughout this disclosure.

Figure 14:
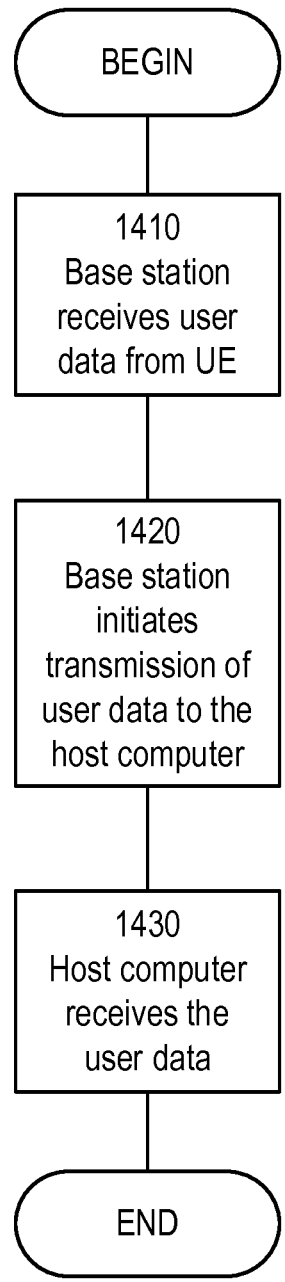

FIG. 14 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 14 will be included in this section. In step 1410 (which may be optional), in accordance with the teachings of the embodiments described throughout this disclosure, the base station receives user data from the UE. In step 1420 (which may be optional), the base station initiates transmission of the received user data to the host computer. In step 1430 (which may be optional), the host computer receives the user data carried in the transmission initiated by the base station.

For the avoidance of doubt, the following statements set out embodiments of the disclosure.

Group A Embodiments

1. A method performed by a wireless device for reconfiguring semi-persistent scheduling, the wireless device being configured with a first semi-persistent scheduling configuration for uplink or downlink transmissions, the method comprising:
   while semi-persistent scheduling is active according to the first semi-persistent scheduling configuration such that the wireless device is configured with periodic transmission or reception opportunities, receiving a semi-persistent scheduling reconfiguration message from a network node, the semi-persistent scheduling reconfiguration message comprising an instruction to reconfigure the wireless device to a second semi-persistent scheduling configuration for uplink or downlink transmissions; and determining one or more transmission or reception opportunities associated with the second semi-persistent scheduling configuration based on a semi-persistent scheduling activation time according to the second semi-persistent scheduling configuration.
2. The method of embodiment 1, wherein the semi-persistent scheduling activation time is the time at which the semi-persistent scheduling reconfiguration message is received.
3. The method of embodiment 1, wherein the semi-persistent scheduling reconfiguration message comprises an indication of the semi-persistent scheduling activation time.
4. The method of embodiment 1 or 3, wherein the semi-persistent scheduling activation time is defined relative to the time at which the semi-persistent scheduling reconfiguration message is received.
5. The method of embodiment 4, wherein the semi-persistent scheduling activation time is defined by an offset from the time at which the semi-persistent scheduling reconfiguration message is received.
6. The method of embodiment 5, wherein the offset is sufficiently long to permit decoding of the semi-persistent scheduling reconfiguration message and reconfiguration of the wireless device to utilize the second semi-persistent scheduling configuration.
7. The method of embodiment 1 or 3, wherein the semi-persistent scheduling activation time is an absolute time.
8. The method of embodiment 1, wherein the semi-persistent scheduling activation time is the time at which a semi-persistent scheduling activation message is received from the network node.
9. The method of embodiment 8, wherein the semi-persistent scheduling activation message is received via a downlink control channel.
10. The method of embodiment 1, wherein the semi-persistent scheduling activation time of the second semi-persistent scheduling configuration is a semi-persistent scheduling activation time of the first semi-persistent scheduling configuration.
11. The method embodiment 10, further comprising calculating the semi-persistent scheduling activation time of the first semi-persistent scheduling configuration based on a previous transmission or reception opportunity associated with the first semi-persistent scheduling configuration.
12. The method of embodiment 11, wherein the semi-persistent scheduling activation time of the first semi-persistent scheduling configuration is further calculated based on a periodicity of the first semi-persistent scheduling configuration and an index of the previous transmission or reception opportunity.
13. The method of any one of the preceding embodiments, further comprising deactivating the first semi-persistent scheduling configuration.
14. The method of embodiment 13, wherein the first semi-persistent scheduling configuration is deactivated at the semi-persistent scheduling activation time of the second semi-persistent scheduling configuration.
15. The method of embodiment 13, wherein the first semi-persistent scheduling configuration is deactivated upon reception of the semi-persistent scheduling reconfiguration message.
16. The method of any one of the preceding embodiments, wherein the one or more transmission or reception opportunities associated with the second semi-persistent scheduling configuration are determined based on a periodicity of the second semi-persistent scheduling configuration.
17. The method of embodiment 16, wherein the one or more transmission or reception opportunities associated with the second semi-persistent scheduling configuration occur at the semi-persistent scheduling activation time and periodically thereafter according to the periodicity of the second semi-persistent scheduling configuration.
18. The method of any one of the preceding embodiments, wherein the semi-persistent scheduling message comprises a radio resource control message.
19. The method of any of the previous embodiments, further comprising:
providing user data; and
forwarding the user data to a host computer via the transmission to the base station.

Group B Embodiments

20. A method performed by a base station for reconfiguring semi-persistent scheduling of a wireless device, the wireless device being configured with active semi-persistent scheduling according to a first semi-persistent scheduling configuration such that the wireless device is configured with periodic transmission or reception opportunities, the method comprising:
initiating transmission of a semi-persistent scheduling reconfiguration message to the wireless device, the semi-persistent scheduling reconfiguration message comprising an instruction to reconfigure the wireless device to a second semi-persistent scheduling configuration for uplink or downlink transmissions; and
providing a semi-persistent scheduling activation time for the second semi-persistent scheduling configuration, to enable the wireless device to determine one or more transmission or reception opportunities associated with the second semi-persistent scheduling configuration.
21. The method of embodiment 20, wherein the semi-persistent scheduling reconfiguration message comprises an indication of the semi-persistent scheduling activation time.
22. The method of embodiment 20, further comprising transmitting a semi-persistent scheduling activation message comprising an indication of the semi-persistent scheduling activation time.
23. The method of embodiment 22, wherein the semi-persistent scheduling activation message is received via a downlink control channel.
24. The method of embodiment 22 or 23, wherein the semi-persistent scheduling activation time is the time at which the semi-persistent scheduling activation message is received.
25. The method of embodiment 20, wherein the semi-persistent scheduling activation time is the time at which the semi-persistent scheduling reconfiguration message is received.
26. The method of any one of embodiments 20 to 23, wherein the semi-persistent scheduling activation time is defined relative to the time at which the semi-persistent scheduling reconfiguration message is received.
27. The method of embodiment 26, wherein the semi-persistent scheduling activation time is defined by an offset from the time at which the semi-persistent scheduling reconfiguration message is received.
28. The method of embodiment 27, wherein the offset is sufficiently long to permit decoding of the semi-persistent scheduling reconfiguration message and reconfiguration of the wireless device to utilize the second semi-persistent scheduling configuration.
29. The method of any one of embodiments 20 to 23, wherein the semi-persistent scheduling activation time is an absolute time.
30. The method of any one of embodiments 20 to 29, wherein the semi-persistent scheduling message comprises a radio resource control message.
31. The method of any of embodiments 20 to 30, further comprising:
obtaining user data; and
forwarding the user data to a host computer or a wireless device.

Group C Embodiments

32. A wireless device for reconfiguring semi-persistent scheduling, the wireless device comprising:
processing circuitry configured to perform any of the steps of any of the Group A embodiments; and
power supply circuitry configured to supply power to the wireless device.
33. A base station for reconfiguring semi-persistent scheduling of a wireless device, the base station comprising:
processing circuitry configured to perform any of the steps of any of the Group B embodiments;
power supply circuitry configured to supply power to the base station.
34. A user equipment (UE) for reconfiguring semi-persistent scheduling, the UE comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of the Group A embodiments;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.
35. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to perform any of the steps of any of the Group B embodiments.
36. The communication system of the previous embodiment further including the base station.
37. The communication system of the previous 2 embodiments, further including the UE, wherein the UE is configured to communicate with the base station.
38. The communication system of the previous 3 embodiments, wherein:
the processing circuitry of the host computer is configured to execute a host application, thereby providing the user data; and
the UE comprises processing circuitry configured to execute a client application associated with the host application.
39. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs any of the steps of any of the Group B embodiments.
40. The method of the previous embodiment, further comprising, at the base station, transmitting the user data.
41. The method of the previous 2 embodiments, wherein the user data is provided at the host computer by executing a host application, the method further comprising, at the UE, executing a client application associated with the host application.
42. A user equipment (UE) configured to communicate with a base station, the UE comprising a radio interface and processing circuitry configured to performs the of the previous 3 embodiments.
43. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's components configured to perform any of the steps of any of the Group A embodiments.
44. The communication system of the previous embodiment, wherein the cellular network further includes a base station configured to communicate with the UE.
45. The communication system of the previous 2 embodiments, wherein:
the processing circuitry of the host computer is configured to execute a host application, thereby providing the user data; and
the UE's processing circuitry is configured to execute a client application associated with the host application.
46. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE performs any of the steps of any of the Group A embodiments.
47. The method of the previous embodiment, further comprising at the UE, receiving the user data from the base station.

48. A communication system including a host computer comprising:
   communication interface configured to receive user data originating from a transmission from a user equipment (UE) to a base station,
   wherein the UE comprises a radio interface and processing circuitry, the UE's processing circuitry configured to perform any of the steps of any of the Group A embodiments.
49. The communication system of the previous embodiment, further including the UE.
50. The communication system of the previous 2 embodiments, further including the base station, wherein the base station comprises a radio interface configured to communicate with the UE and a communication interface configured to forward to the host computer the user data carried by a transmission from the UE to the base station.
51. The communication system of the previous 3 embodiments, wherein:
   the processing circuitry of the host computer is configured to execute a host application; and
   the UE's processing circuitry is configured to execute a client application associated with the host application, thereby providing the user data.
52. The communication system of the previous 4 embodiments, wherein:
   the processing circuitry of the host computer is configured to execute a host application, thereby providing request data; and
   the UE's processing circuitry is configured to execute a client application associated with the host application, thereby providing the user data in response to the request data.
53. A method implemented in a communication system including a host computer, a base station and a user equipment (UE), the method comprising:
   at the host computer, receiving user data transmitted to the base station from the UE, wherein the UE performs any of the steps of any of the Group A embodiments.
54. The method of the previous embodiment, further comprising, at the UE, providing the user data to the base station.
55. The method of the previous 2 embodiments, further comprising:
   at the UE, executing a client application, thereby providing the user data to be transmitted; and
   at the host computer, executing a host application associated with the client application.
56. The method of the previous 3 embodiments, further comprising:
   at the UE, executing a client application; and
   at the UE, receiving input data to the client application, the input data being provided at the host computer by executing a host application associated with the client application,
   wherein the user data to be transmitted is provided by the client application in response to the input data.
57. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.
58. The communication system of the previous embodiment further including the base station.
59. The communication system of the previous 2 embodiments, further including the UE, wherein the UE is configured to communicate with the base station.
60. The communication system of the previous 3 embodiments, wherein:
   the processing circuitry of the host computer is configured to execute a host application;
   the UE is configured to execute a client application associated with the host application, thereby providing the user data to be received by the host computer.
61. A method implemented in a communication system including a host computer, a base station and a user equipment (UE), the method comprising:
   at the host computer, receiving, from the base station, user data originating from a transmission which the base station has received from the UE, wherein the UE performs any of the steps of any of the Group A embodiments.
62. The method of the previous embodiment, further comprising at the base station, receiving the user data from the UE.
63. The method of the previous 2 embodiments, further comprising at the base station, initiating a transmission of the received user data to the host computer.

Abbreviations

At least some of the following abbreviations may be used in this disclosure. If there is an inconsistency between abbreviations, preference should be given to how it is used above. If listed multiple times below, the first listing should be preferred over any subsequent listing(s).
1xRTT CDMA2000 1xRadio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

APPENDIX

In the following, various embodiments are described in context of NR.

As a first embodiment, if an SPS (or Type 2 configured UL scheduling) reconfiguration message is received when there is an existing SPS assignment (or configured UL grant of Type 2) active, the UE continues to use the active SPS assignment or configured UL grant of type 2 associated with the old SPS (or Type 2 configured UL scheduling) configuration until a new activation command is received. When a new activation command is received, the UE should determine the reception/transmission opportunity occurrences based on the new activation time and the new SPS (or Type 2 configured UL scheduling) configuration. As another option, the gNB can include an activation time associated with the new SPS configuration in RRC signalling, the activation time shall leave sufficient time for the UE to process the RRC signalling before activation of the new configuration. In this option, the gNB doesn't need to send another DCI to activate the new SPS configuration.

The benefit of this embodiment is that the network can continue to serve a UE with the existing active SPS assignment or configured UL grant Type2 during the SPS configuration transition period, and the network can explicitly indicate/signalling when to activate an SPS assignment (or configured UL grant of Type 2) using a PDCCH DCI signalling.

As a second embodiment, if an SPS (or Type 2 configured UL scheduling) reconfiguration message is received when there is an active SPS assignment (or configured UL grant of Type 2), the UE should deactivate the existing SPS assignment (or configured UL grant of Type 2) immediately. When the gNB activates a new SPS assignment (or configured UL grant of Type 2), the new SPS (or Type 2 configured UL scheduling) is applied.

This method is simple but there may be no available SPS assignment (or configured UL grant of Type 2) during the transition period of SPS (or Type 2 configured UL scheduling) reconfiguration. However, the interval without available SPS assignment (or configured UL grant of Type 2)

could be very short since the gNB can activate the SPS assignment (or configured UL grant of Type 2) immediately after the reconfiguration.

As a third embodiment, if an SPS (or Type 2 configured UL scheduling) reconfiguration message is received when there is an active SPS assignment (or configured UL grant of Type 2), the UE derives the elapsed time since the existing active SPS assignment (or configured UL grant of Type 2) has been activated (e.g., based on the present index of the reception/transmission opportunity occurrence), correspondingly, the UE determines in which hyper-frame the existing active SPS assignment (or configured UL grant of Type 2 was activated. Further, the UE can determine the first available reception/transmission opportunity occurrence based on the determined activation time and the new configuration of SPS (or Type 2 configured UL scheduling).

For instance, if the last reception/transmission opportunity is X-th occasion according to the existing configuration, p slot and q OFDM symbols have elapsed since the last reception/transmission opportunity, the total number of OFDM symbols since the activation time is: (X−1)*old_period (in OFDM symbols)+p*number of OFDM symbols in a slot+q.

Further, the UE can 1) determine the activation time by going retrospectively from the present SFN number, present slot number and present OFDM symbol number considering the total elapsed time.

2) Determine the index of the first reception/transmission opportunity occasion according to the new configuration based on the elapsed time from the last activation time based on the formula ceiling(the total elapsed time/the new periodicity).

This reception/transmission opportunity occasion can be used as a reference to determine the later reception/transmission opportunity occasion.

Afterwards, the UE can determine the later reception/transmission opportunity occurrences according to the new configuration based on the existing formula described in Section 2.1.1 using the achieved parameters such as activation time and the index of the reference reception/transmission opportunity occurrence.

The invention claimed is:

1. A method performed by a wireless device for reconfiguring semi-persistent scheduling, the wireless device being configured with a first semi-persistent scheduling configuration for uplink or downlink transmissions, the method comprising:
while semi-persistent scheduling is active according to the first semi-persistent scheduling configuration such that the wireless device is configured with periodic transmission or reception opportunities, receiving a semi-persistent scheduling reconfiguration message from a network node, the semi-persistent scheduling reconfiguration message comprising an instruction to reconfigure the wireless device to a second semi-persistent scheduling configuration for uplink or downlink transmissions; and
determining one or more transmission or reception opportunities associated with the second semi-persistent scheduling configuration based on a semi-persistent scheduling activation time according to the second semi-persistent scheduling configuration.

2. The method of claim 1, wherein the semi-persistent scheduling reconfiguration message comprises an indication of the semi-persistent scheduling activation time.

3. A method performed by a base station for reconfiguring semi-persistent scheduling of a wireless device, the wireless device being configured with active semi-persistent scheduling according to a first semi-persistent scheduling configuration such that the wireless device is configured with periodic transmission or reception opportunities, the method comprising:
initiating transmission of a semi-persistent scheduling reconfiguration message to the wireless device, the semi-persistent scheduling reconfiguration message comprising an instruction to reconfigure the wireless device to a second semi-persistent scheduling configuration for uplink or downlink transmissions; and
providing a semi-persistent scheduling activation time for the second semi-persistent scheduling configuration, to enable the wireless device to determine one or more transmission or reception opportunities associated with the second semi-persistent scheduling configuration.

4. The method of claim 3, wherein one of the following applies:
the semi-persistent scheduling reconfiguration message comprises an indication of the semi-persistent scheduling activation time; or
the method further comprises transmitting a semi-persistent scheduling activation message comprising an indication of the semi-persistent scheduling activation time.

5. The method of claim 4, wherein the semi-persistent scheduling activation time is the time at which the semi-persistent scheduling activation message or the semi-persistent scheduling reconfiguration message is received.

6. The method of claim 3, wherein the semi-persistent scheduling activation time is defined by an offset from the time at which the semi-persistent scheduling reconfiguration message is received, or wherein the semi-persistent scheduling activation time is an absolute time.

7. A wireless device for reconfiguring semi-persistent scheduling, the wireless device being configured with a first semi-persistent scheduling configuration for uplink or downlink transmissions, the wireless device comprising:
processing circuitry configured to:
while semi-persistent scheduling is active according to the first semi-persistent scheduling configuration such that the wireless device is configured with periodic transmission or reception opportunities, receive a semi-persistent scheduling reconfiguration message from a network node, the semi-persistent scheduling reconfiguration message comprising an instruction to reconfigure the wireless device to a second semi-persistent scheduling configuration for uplink or downlink transmissions; and
determine one or more transmission or reception opportunities associated with the second semi-persistent scheduling configuration based on a semi-persistent scheduling activation time according to the second semi-persistent scheduling configuration; and
power supply circuitry configured to supply power to the wireless device.

8. The wireless device of claim 7, wherein the semi-persistent scheduling reconfiguration message comprises an indication of the semi-persistent scheduling activation time.

9. The wireless device of claim 7, wherein the offset is sufficiently long to permit decoding of the semi-persistent scheduling reconfiguration message and for the wireless device to apply the second semi-persistent scheduling configuration.

10. The wireless device of claim 7, wherein the semi-persistent scheduling activation time is the time at which a semi-persistent scheduling activation message is received from the network node.

11. The wireless device of claim 7, wherein the semi-persistent scheduling activation time of the second semi-persistent scheduling configuration is a semi-persistent scheduling activation time of the first semi-persistent scheduling configuration.

12. The wireless device of claim 11, wherein the processing circuitry is further configured to calculate the semi-persistent scheduling activation time of the first semi-persistent scheduling configuration based on a previous transmission or reception opportunity associated with the first semi-persistent scheduling configuration.

13. The wireless device of claim 12, wherein the semi-persistent scheduling activation time of the first semi-persistent scheduling configuration is further calculated based on a periodicity of the first semi-persistent scheduling configuration and an index of the previous transmission or reception opportunity.

14. The wireless device of claim 7, wherein the processing circuitry is further configured to deactivate the first semi-persistent scheduling configuration.

15. The wireless device of claim 14, wherein the first semi-persistent scheduling configuration is deactivated at the semi-persistent scheduling activation time of the second semi-persistent scheduling configuration, or wherein the first semi-persistent scheduling configuration is deactivated upon reception of the semi-persistent scheduling reconfiguration message.

16. The wireless device of claim 7, wherein the one or more transmission or reception opportunities associated with the second semi-persistent scheduling configuration are determined based on a periodicity of the second semi-persistent scheduling configuration.

17. A base station for reconfiguring semi-persistent scheduling of a wireless device, the wireless device being configured with active semi-persistent scheduling according to a first semi-persistent scheduling configuration such that the wireless device is configured with periodic transmission or reception opportunities, the base station comprising:
  processing circuitry configured to:
    initiate transmission of a semi-persistent scheduling reconfiguration message to the wireless device, the semi-persistent scheduling reconfiguration message comprising an instruction to reconfigure the wireless device to a second semi-persistent scheduling configuration for uplink or downlink transmissions; and
    provide a semi-persistent scheduling activation time for the second semi-persistent scheduling configuration, to enable the wireless device to determine one or more transmission or reception opportunities associated with the second semi-persistent scheduling configuration; and
  power supply circuitry configured to supply power to the base station.

18. The base station of claim 17, wherein one of the following applies:
  the semi-persistent scheduling reconfiguration message comprises an indication of the semi-persistent scheduling activation time; or
  the method further comprises transmitting a semi-persistent scheduling activation message comprising an indication of the semi-persistent scheduling activation time.

19. The base station of claim 18, wherein the semi-persistent scheduling activation time is the time at which the semi-persistent scheduling activation message or the semi-persistent scheduling reconfiguration message is received.

20. The base station of claim 17, wherein the semi-persistent scheduling activation time is defined by an offset from the time at which the semi-persistent scheduling reconfiguration message is received, or wherein the semi-persistent scheduling activation time is an absolute time.

\* \* \* \* \*